(12) United States Patent
McCrary et al.

(10) Patent No.: US 9,096,790 B2
(45) Date of Patent: *Aug. 4, 2015

(54) LOW TEMPERATURE COATED PARTICLES COMPRISING A CURABLE LIQUID AND A REACTIVE POWDER FOR USE AS PROPPANTS OR IN GRAVEL PACKS, METHODS FOR MAKING AND USING THE SAME

(75) Inventors: Avis Lloyd McCrary, Montgomery, TX (US); Robert Ray McDaniel, Houston, TX (US); John W. Green, Cypress, TX (US)

(73) Assignee: HEXION INC., Columbus, OH (US)

( * ) Notice: Subject to any disclaimer, the term of this patent is extended or adjusted under 35 U.S.C. 154(b) by 632 days.

This patent is subject to a terminal disclaimer.

(21) Appl. No.: 12/605,990

(22) Filed: Oct. 26, 2009

(65) Prior Publication Data

US 2010/0065271 A1    Mar. 18, 2010

Related U.S. Application Data

(63) Continuation-in-part of application No. 11/726,573, filed on Mar. 22, 2007, now Pat. No. 7,624,802.

(51) Int. Cl.
| | |
|---|---|
| *B32B 5/16* | (2006.01) |
| *B32B 27/00* | (2006.01) |
| *B05D 7/00* | (2006.01) |
| *C09K 8/80* | (2006.01) |
| *B32B 19/00* | (2006.01) |
| *E21B 43/267* | (2006.01) |
| *C08K 9/08* | (2006.01) |

(52) U.S. Cl.
CPC . *C09K 8/805* (2013.01); *B32B 5/16* (2013.01); *C08K 9/08* (2013.01); *Y10T 428/2438* (2015.01); *Y10T 428/24405* (2015.01)

(58) Field of Classification Search
None
See application file for complete search history.

(56) References Cited

U.S. PATENT DOCUMENTS

| | | | |
|---|---|---|---|
| 4,113,700 A * | 9/1978 | Culbertson | 528/138 |
| 4,428,427 A | 1/1984 | Friedman | |
| 4,518,039 A | 5/1985 | Graham et al. | |
| 4,585,064 A | 4/1986 | Graham et al. | |
| 4,717,594 A | 1/1988 | Graham et al. | |
| 4,920,199 A | 4/1990 | Jarzombek et al. | |
| 5,218,038 A | 6/1993 | Johnson et al. | |
| 5,422,183 A | 6/1995 | Sinclair et al. | |

(Continued)

*Primary Examiner* — Holly Le
*Assistant Examiner* — Thomas Mangohig

(57) ABSTRACT

Disclosed herein are free flowing coated particles and low temperature methods of making same. Each particle has a curable coating disposed upon a substrate. The substrate is a particulate substrate including an inorganic material, a particulate substrate including an organic material, a composite substantially homogeneous formed particle including a first portion of an at least partly cured binder and filler particles, or a hybrid particle having an inorganic particle as a core and a composite coating including at least partially cured resin and filler. The curable coating includes a continuous phase including a curable liquid resin and reactive powder particles embedded or adhered to the continuous phase. The reactive powder particles typically include one or more of a resole phenolic-formaldehyde resin, a novolak phenolic-formaldehyde resin, a polyester resin, an acrylic polymer resin, a urethane resin or an epoxy resin. A method including applying a coating including the continuous phase including the curable resin and reactive or non-reactive powder particles embedded or adhered to the continuous phase.

28 Claims, 5 Drawing Sheets

(56) References Cited

U.S. PATENT DOCUMENTS

| | | |
|---|---|---|
| 5,775,425 A | 7/1998 | Weaver et al. |
| 5,833,000 A | 11/1998 | Weaver et al. |
| 5,916,933 A | 6/1999 | Johnson et al. |
| 6,311,773 B1 | 11/2001 | Todd et al. |
| 6,364,019 B1 | 4/2002 | Aggour et al. |
| 6,382,319 B1 | 5/2002 | Hill, Jr. et al. |
| 6,406,789 B1 | 6/2002 | McDaniel et al. |
| 6,528,157 B1 | 3/2003 | Hussain et al. |
| 6,582,819 B2 | 6/2003 | McDaniel et al. |
| 6,632,527 B1 | 10/2003 | McDaniel et al. |
| 6,892,813 B2 | 5/2005 | Nguyen et al. |
| 7,153,575 B2 | 12/2006 | Anderson et al. |
| 7,624,802 B2 | 12/2009 | McCrary et al. |
| 2005/0019574 A1 | 1/2005 | McCrary |
| 2005/0194137 A1 | 9/2005 | Nguyen et al. |
| 2006/0078682 A1 | 4/2006 | McDaniel et al. |
| 2008/0213489 A1 | 9/2008 | Verghese et al. |

* cited by examiner

LOW TEMPERATURE COATED PARTICLES COMPRISING A CURABLE LIQUID AND A REACTIVE POWDER FOR USE AS PROPPANTS OR IN GRAVEL PACKS, METHODS FOR MAKING AND USING THE SAME

RELATED APPLICATION DATA

This application is a Continuation-in-Part of U.S. patent application Ser. No. 11/726,573, filed Mar. 22, 2007, the entire contents of which are incorporated herein by reference.

FIELD OF THE INVENTION

The disclosure relates to coated particles and to methods for making and using the same. In particular, this disclosure relates to coated particles that are used in well stimulation treatments as proppants or in gravel packs, and made by coating a particle with a curable liquid resin at ambient temperature, applying a reactive powder (e.g., a resole powder, a novolak powder, a polyester powder, an acrylic polymer powder, a urethane powder or an epoxy powder) to the coated particle and mixing until dry at low temperature. If desired the particles may also be used in coated sand applications for the foundry industry.

BACKGROUND OF THE INVENTION

The term "proppant" is indicative of particulate material which is injected into fractures in subterranean formations surrounding oil wells, gas wells, water wells, and other similar bore holes to provide support to hold (prop) these fractures open and allow gas or liquid to flow through the fracture to the bore hole or from the formation. Proppants are commonly used to prop open fractures formed in subterranean formations such as oil and natural gas wells during hydraulic fracturing.

Uncoated and/or coated particles are often used as proppants to keep open fractures imposed by hydraulic fracturing upon a subterranean formation, e.g., an oil or gas bearing strata, or as filtering media in gravel packs.

The uncoated proppants are typically particles of sand, ceramics, glass beads, walnut shells, etc. as known in the art. Particles used to prop fractures generally comprise sand or sintered ceramic particles. The advantage of sand is that it is inexpensive. Its disadvantages are its relatively low strength (high crush values) and lower flow capacities than sintered ceramic particles. Sintered ceramic particles are disadvantageous in that the sintering is carried out at high temperatures, resulting in high energy costs to produce, and expensive raw materials are used.

The coated proppants have individual particles coated with a resin. The individual particles are typically particles of sand, ceramics, glass beads, walnut shells, etc. as known in the art. The proppant coatings may be precured or curable. The precured proppants include a substrate core and a coating of resin cured prior to insertion into the subterranean formation. The curable proppants include a substrate core and a coating of resin cured downhole to form a consolidated proppant pack. Resin formulations typically used for curable coatings on proppant substrates (sand, ceramic, etc.) result in a highly crosslinked coating on the surface of the substrates.

Curable resin coated proppants and precured resin coated proppants have been commercially available for use as propping agents. A curable proppant has a resin coating that includes a resin that is usually at least partially, and but not fully, cured. In contrast, a "precured" proppant has a cured resin coating. The terms "cured" and "curable" are defined for the present specification by three tests historically employed in the art.

a) Temperature Stick Point Test: placing coated material on a heated melt point bar and determining the lowest temperature at which the coated material adheres to the melt point bar. A "sticking temperature" of greater than 350° F., typically indicates a cured material, depending upon the resin system used.

b) Acetone Extraction Test: an acetone extraction method, as described below, to dissolve the fraction of resin within the coating that is uncured. A weight loss of <5% typically indicates that the particle has a procured coating.

c) Compressive Strength Test: no bonding, or no consolidation of the coated particles, following wet compression at 1000 psi at 200° F. for a period of as much as 24 hours, which typically indicates a coating that was precured in the manufacturing process.

Unless otherwise indicated, the terms cured and curable are defined by the Compressive Strength Test.

Proppants are generally used to increase production of oil and/or gas by providing a conductive channel in the formation. Fracturing of the subterranean formation is conducted to increase oil and/or gas production. Fracturing is caused by injecting a viscous fracturing fluid or a foam at a high pressure (hereinafter injection pressure) into the well to create a fracture. A similar effect can be achieved by pumping a thin fluid (water containing a low concentration of polymer) at a high injection rate. As the fracture is formed, a particulate material, referred to as a "propping agent" or "proppant" is placed in the formation to maintain the fracture in a propped condition when the injection pressure is released. As the fracture forms, the proppants are carried into the fracture by suspending them in additional fluid or foam to fill the fracture with a slurry of proppant in the fluid or foam. Upon release of the pressure, the proppants form a pack that serves to hold open the fractures. The propped fracture thus provides a highly conductive channel in the formation. The degree of stimulation afforded by the hydraulic fracture treatment is largely dependent upon formation parameters, the fracture's permeability, the propped fracture length, propped fracture height and the fracture's propped width.

Gravel packing treatments are used to reduce the migration of unconsolidated formation sands/fines into the well bore. In gravel packing operations, the coated and/or uncoated particles suspended in a carrier fluid are pumped into a well bore in which the gravel pack is to be placed. The carrier fluid leaks off into the subterranean zone and/or is returned to the surface while the particles are left in the annulus between the production string and the casing or outside the casing in the subterranean zone adjacent to the wellbore.

Gravel pack operations generally involve placing a gravel pack screen in the well bore and packing the surrounding annulus between the screen and the well bore with the particles. The gravel pack screen is generally a type of filter assembly used to support and retain the particles placed during the gravel pack operation. A wide range of sizes and screen configurations are available to suit the characteristics of a particular well bore, the production fluid, and the subterranean formation sands. Such gravel packs may be used to stabilize the formation while causing minimal impairment to well productivity. The gravel pack acts as a filter to separate formation sands from produced fluids while permitting the produced oil and/or gas to flow into the well bore. The particles act to prevent formation sands from plugging the screen or migrating with the produced fluids, and the screen acts to prevent fines from being produced to the surface and out of the well.

Gravel packing may also be used to protect the well borewall production integrity by employing a tightly packed deposit of aggregate comprising sand, gravel or both between the borewall and the production pipe thereby avoiding the time and expense of setting a steel casing from the surface to the production zone which may be many thousands of feet below the surface. The gravel packing is inherently permeable to the desired hydrocarbon fluid and provides structural reinforcement to the borewall against an interior collapse or flow degradation. Such well completion systems are called "open hole" completions. The apparatus and process by which a packed deposit of gravel is placed between the borehole wall and the production pipe is encompassed within the definition of an "open hole gravel pack system." Unfortunately, prior art open hole gravel pack systems. for placing and packing gravel along a hydrocarbon production zone, have been attended by a considerable risk of precipitating a borehole wall collapse due to fluctuations in the borehole pressure along the production zone. These pressure fluctuations are generated by surface manipulations of the downhole tools in direct fluid circulation within the well and completion string. Further discussion of gravel packs is presented by U.S. Pat. No. 6,382,319 incorporated herein by reference.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

Moreover, sand control is another consideration when extracting hydrocarbons such as natural gas and crude oil from the earth's subsurface formations, from boreholes drilled into hydrocarbon bearing production zones. Production of oil, gas and water from unconsolidated or weakly consolidated formations is normally accompanied by the production of formation sand particles along with the produced fluids. The production of sand with the well fluids poses serious problems such as the erosion of sub-surface and surface production facilities and the accumulation of the sand in the wellbore and surface separators. Several methods such as gravel packing, screens and plastic consolidation have been in use for many years with varying success. However, these methods have several-technical and cost limitations. Further discussion of sand control is presented by U.S. Pat. No. 6,364,019 incorporated herein by reference in its entirety.

When the oilfield industry "fractures" hydrocarbon bearing formations, the use of proppants to retain the high surface area created by the fracture has become common practice. It is highly desirable that the proppant particles are of high performance and can be produced in highly efficient processes (are economically attractive). It is further desirable to develop coated particles that can be produced at remote sites, such as field applied at or near the wellsite.

SUMMARY OF THE INVENTION

In one embodiment, there is provided free flowing coated particles having a particle size range of about 6 mesh to about 200 mesh (3360-74 µm), each particle includes (1) a substrate selected from (i) a particulate substrate comprising an inorganic material and optionally an at least partially cured coating, (ii) a particulate substrate comprising an organic material and optionally an at least partially cured coating, (iii) a composite particle comprising a substantially homogeneous formed particle comprising a first portion of a binder and filler particles dispersed throughout said first portion of binder, wherein said first portion is at least partly cured, wherein the particle size of the filler particles ranges from about 0.5 to about 60 µm, or (iv) a hybrid particle comprising a composite layer disposed on an inorganic particulate core, the composite layer comprising an at least partially cured organic coating and filler particles, wherein the particle size of the filler particles ranges from about 0.5 to about 60 µm; and (2) a coating disposed upon the substrate, the coating comprising a continuous phase comprising a curable liquid resin and a reactive powder embedded or adhered to the continuous phase.

In another embodiment, the curable liquid resin in the above described free flowing coated particles includes resole phenolic-formaldehyde resins, polyester or unsaturated polyester resins, acrylic polymer resins, urethane resins, epoxy resins, melamine resins, anhydride resins or any combination or subset thereof.

In another embodiment, the reactive powder in the above described free flowing coated particles includes resole phenolic-formaldehyde resins, novolak phenolic-formaldehyde resins, polyester resins, acrylic polymer resins, urethane resins, epoxy resins or any combination or subset thereof.

In another embodiment, the above described free flowing coated particles further include a surface treatment which includes resole phenolic-formaldehyde resins, polyester or unsaturated polyester resins, acrylic polymer resins, urethane resins, epoxy resins, melamine resins, anhydride resins or any combination or subset thereof.

In another embodiment, there is provided a method of preparing the above described free flowing coated particles which includes mixing the substrate with the curable liquid resin at a temperature of between about 50° F. to about 150° F. to form the coating comprising the continuous phase, then admixing the reactive powder such that it is embedded in or adhered to the continuous phase.

In another embodiment, the above method further includes the step of applying a surface treatment to the free flowing coated particles.

The powders employed in the method may be reactive or non-reactive.

The reactive powders in the products and/or methods are reactive with at least the above-mentioned continuous phase. Employing reactive powders advantageously improves unconfined compressive strength properties of the particle. Non-reactive powders, for example, silica flour are inert with respect to the continuous phase, and may be added to improve processing or storage properties.

Typically the reactive powders comprise at least one member of the group consisting of resole phenolic-formaldehyde resins, novolak phenolic-formaldehyde resins, polyester resins, acrylic polymer resins, urethane resins and epoxy resins. The method of making utilizes the low temperature application of organic resins to sand and ceramic substrates in cycles requiring only a matter of minutes that yields high performance coated particles for the oilfield (and foundry) industry. The powder is added to effectively dry the applied liquid coating and allow the coated particles to be separated and free flowing.

The substrate is defined as the portion of the particle coated by the one or more outer coatings of the present invention.

The substrate can be present in the coated particles in an amount of about 85 to about 99.5 weight percent (wt. %), based on the total weight of the coated particles. In one embodiment, in which the outer coating is placed directly on a sand or ceramic particle, the substrate is present in an amount of about 95 to 99.5 wt %, based on the total weight of the coated particles.

The outer resin coating typically is between 0.5 to 15% of the total weight of the particle. In another embodiment, the resin coating is between 0.5 to 6.0% of the total weight of the particle.

In one embodiment, the outer coating is placed directly on a single inorganic particle. Typically the particulate substrate comprising an inorganic material is a sand or a ceramic particulate substrate. A preferred inorganic substrate is 40/70 sand. In embodiments employing the inorganic particulate substrate coated with the one or more layers of coating comprising a continuous phase comprising curable liquid resin and reactive powder particles, preferably the dry free flowing particle has a loss on ignition (LOI) of about 0.3 to about 8%, about 0.3 to about 5%, about 0.5 to 5%, about 0.75 to 4% or about 0.75 to 3%. Unless otherwise stated, all percentages disclosed in this specification are weight percents.

In embodiments employing an organic particulate substrate, preferably the dry free flowing particle has a LOI of about 0.3 to about 5%, not including the LOI attributable to the ignition of the organic particulate substrate.

In embodiments of a coated particle in which the substrate is a composite particle, then the LOI would be the combination of the LOI of the composite substrate (which would normally be in the 12-15% range based on the total weight of the substrate, after it has been cured) plus the LOI of the resin coating on the substrate (0.5 to 5% by weight based on the total weight of the coated particle). In such embodiments the overall LOI is typically about 12% to about 20% (including the LOI attributable to the organic binder of the composite substrate and the coating, but not including the LOI, if any, attributable to the filler of the composite substrate). Typically, the filler particles are about 70 to 90 weight percent of the composite particle. Typically, the composite substrate is about 95 to about 99.5 wt % of the coated particle of this invention.

The composite substrate may comprise about 10 to about 90 weight percent (wt. %), typically about 70 to about 90 wt. %, inorganic filler materials based on the total weight of the composite substrate. In an embodiment, the inorganic materials can be present in an amount of about 20 to about 80 weight percent (wt. %), based on the total weight of the composite substrate. In another embodiment, the inorganic materials can be present in an amount of about 30 to about 70 weight percent (wt. %), based on the total weight of the composite substrate. In yet another embodiment, the inorganic materials can be present in an amount of about 40 to about 60 weight percent (wt. %), based on the total weight of the composite substrate.

Typically, the composite particle has a sphericity of at least about 0.7.

In embodiments of a coated particle in which the substrate is a hybrid particle (inorganic particulate core having a composite layer of the organic coating and inorganic filler), then the LOI would be the combination of the LOI of the hybrid substrate (which would normally be in the about 5 to about 20% range based on the total weight of the substrate, after it has been cured) plus the LOI of the resin coating on the substrate (0.5 to 5% by weight based on the total weight of the coated particle). In such embodiments the overall LOI is typically about 5.5% to about 25% (including the LOI attributable to the organic binder of the hybrid substrate and the coating). Typically, the cured or at least partially cured composite layer is about 25 to about 40 weight % of the hybrid particle. Typically, the hybrid particle is about 95 to 99 weight % of the coated particle of this invention.

The ratio of components, order of additions and time of the addition and mixing are selected to form such free flowing particles. For example, if the powder is mixed with the inorganic uncoated substrate particles before the curable liquid resin is applied, then adequate coating does not occur. Also, the ratio of curable liquid resin and powder is selected to achieve proper coating. Too much powder results in excess loose powder, and too much liquid curable resin delays drying out and becoming free flowing. Either situation will contribute to particle agglomerations (multiple particles sticking together) and affect storage stability of the finished product.

The present invention relates to a method of forming a proppant pack or a gravel pack comprising suspending the above-described free flowing particles in a carrier fluid to form a suspension and injecting the suspension into a subterranean formation.

The present invention also relates to a proppant or gravel pack particle comprising a substrate having a coating of curable liquid resin containing reactive powder embedded in the curable resin coating.

Coating sand or ceramic substrates with a curable liquid resin at room temperature, followed by the introduction of a powdered phenol-formaldehyde novolak resin (with or without curatives such as hexamethylenetetramine) yields a high performance, free flowing resin coated particle that can be used as an oilfield proppant.

The liquid resin coating is reactive with the reactive powder. For example, a resole coating may assist with curing the novolak powder and/or the powder may contain hexamethylenetetramine (HEXA) to assist in curing the resole coating. Typically the reactive powder or non-reactive powder has an average particle size of about 200 mesh (74 microns) or smaller, or about 230 mesh (63 microns) or smaller; or about 270 mesh (about 53 microns) or smaller. For example, typical particle size of powdered resin ranges from 5 to 35 microns with a small amount of fines. Preferably the reactive powder comprises a novolak powder or a resole powder. Generally at least a majority of the powder in or on the coating comprises reactive resin powder. The non-reactive powders and reactive powders do not dissolve or do not appreciably dissolve in aqueous servicing fluids and oil-based servicing fluids.

In the outer curable coating the typical ratio of liquid resin to powder (total of reactive powder and optional inorganic powder) is approximately 1:3 to 1:6. The weight ratio of the liquid resin to powder of the outer coating is preferably 12-30% liquid resin and 70-88% powder. When this is applied to the substrate, some of the liquid resin evaporates, so on a dry solids basis, we have a ratio of 8-20% solids from the original liquid resin and 80-92% solids from the powder. Thus, for example, for a particle having an inorganic particulate substrate and an LOI of about 3 weight percent, the total powder on the final particles would be 80-90% ×3%=2.4-2.7 weight %. The liquid to powder ratio may change depending on surface area of the particle being covered, liquid resin's flow properties and powdered resin particle size distribution. Conditions and weight ratios are determined to obtain so the resulting product particles are dry and free flowing with little or no free excess powder.

The curable coatings can be applied at/near the wellsite. In this process, the operations may be a continuous addition to a moving bed of the substrate. However, producing the coated particles by this process is within the scope of this invention whether precoated onto the proppant at the sand coating plant or various remote locations, such as a part of a transload/inventory warehouse, at or near a wellsite. The process is also a quick and economical way to expand production capacity and with low capital costs.

The present invention is advantageous because the method results in a curable coated particle that binds downhole. Also, the present method can be performed in remote locations in a low cost plant. Freight savings may also exist by minimizing the costs associated with transporting substrates. Also, this no (or low) heating process achieves energy savings over comparable processes which heat phenol-formaldehyde resins to melt the coating onto the substrate, to drive off the aqueous portion of a liquid resin or which apply heat to dry or cure the resin coating. Also, by avoiding heating the present method minimizes emissions of volatiles which must be dealt with in a process which heats phenol-formaldehyde resins to melt the coating onto the substrate, to drive off the aqueous portion of a liquid resin or which apply heat to dry or cure the resin coating.

BRIEF DESCRIPTION OF THE FIGURES

The following is a brief description of figures wherein like numbering indicates like elements.

DETAILED DESCRIPTION OF THE PREFERRED EMBODIMENTS

As used herein, the terms "first," "second," and the like do not denote any order or importance, but rather are used to distinguish one element from another, and the terms "the", "a" and "an" do not denote a limitation of quantity, but rather denote the presence of at least one of the referenced items. Furthermore, all ranges disclosed herein are inclusive of the endpoints and independently combinable.

The present proppant or gravel pack particle comprises a particle substrate having a coating of curable liquid resin containing reactive powder embedded in the curable liquid resin coating. The reactive powder may be a resole phenolic-formaldehyde resin powder, a novolak phenolic-formaldehyde resin powder, a polyester resin powder, an acrylic polymer resin powder, a urethane resin powder, or an epoxy resin powder, including any combination or subset of such reactive powders.

Typically for proppant, gravel pack or foundry sand, individual particles of the particulate substrate have a particle size in the range of USA Standard Testing screen numbers from about 6 to 200 mesh, e.g., 20 to 40 mesh. Typically for proppant or gravel pack individual particles of the particulate substrate have a particle size in the range of USA Standard Testing screen numbers from about 8 to about 100 mesh (i.e. screen openings of about 0.0937 inch to about 0.0059 inch), 20 to 80 mesh, or preferably 40 to 70 mesh. Typical individual particles of the particulate substrate have a diameter of about 0.01 to about 0.04 inches. Typically for foundry applications the substrate is sand or ceramic with particle size ranging from 30 to 140 mesh.

For example, the substrates 2, 21, 42 of, FIGS. 1-4 can have average particle sizes of about 100 micrometers to about 1,400 micrometers (about 140 mesh to about 14 mesh) or about 300 micrometers to about 600 micrometers (about 50 mesh to about 30 mesh) or about 400 micrometers to about 850 micrometers (about 40 mesh to about 20 mesh).

The organic coating disposed upon the substrate is curable prior to its use as a proppant or in a gravel pack.

Figure 1:
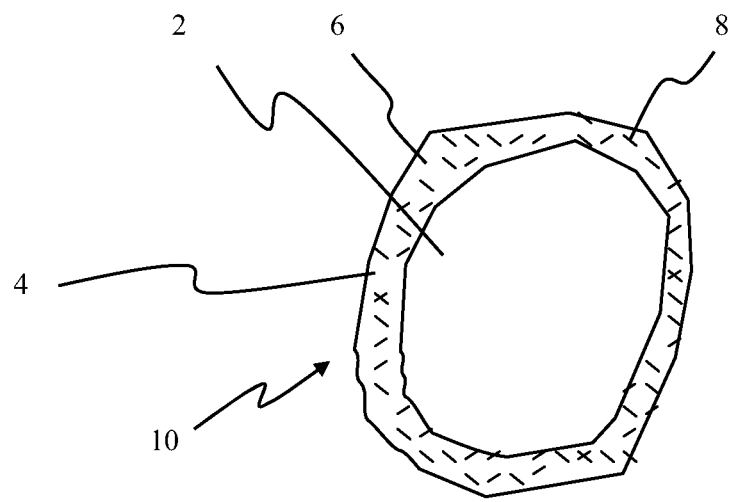
FIG. 1 depicts an embodiment of a coated particle comprising a solid inorganic or solid organic substrate upon which is disposed a resole coating that comprises a reactive powder.

FIG. 1 shows an exemplary embodiment of the coated particle 10 comprises a particulate substrate 2 upon which is disposed an organic coating 4. The particulate substrate 2 can comprise an organic material and/or an inorganic material. The substrate 2 preferably comprises a single inorganic particle. The organic coating 4 comprises a curable liquid resin as a continuous phase 6 and a reactive powder 8 embedded or adhered to the continuous phase 6. If desired, a non-reactive powder such as inert inorganic or inert organic filler powders, such as silica flour, may be employed together with or in place of the reactive powder 8. Reactive powders are preferred because they advantageously may improve the unconfined compressive strength of the particle 10.

Figure 2:
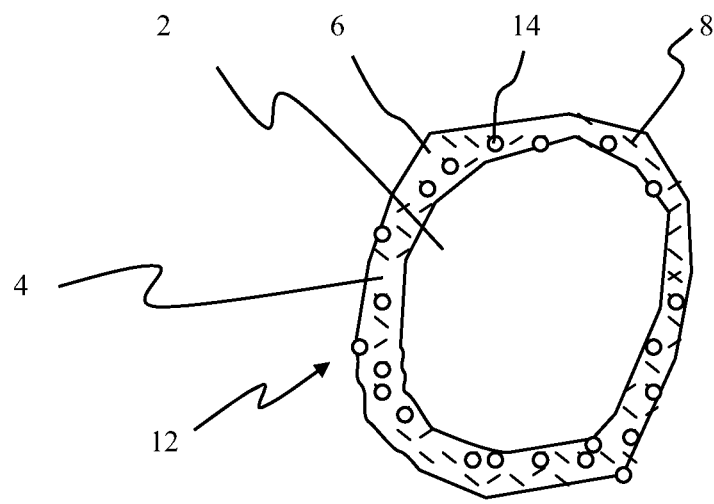
FIG. 2 depicts another embodiment of a coated particle that comprises a solid inorganic substrate upon which is disposed a resole coating that comprises a reactive powder and inorganic or inert organic fillers.

FIG. 2 depicts a coated particle 12 which is the embodiment of FIG. 1 modified to further include inert inorganic or inert organic filler particles 14 embedded or adhered to the continuous curable liquid resin phase 6.

Figure 3:
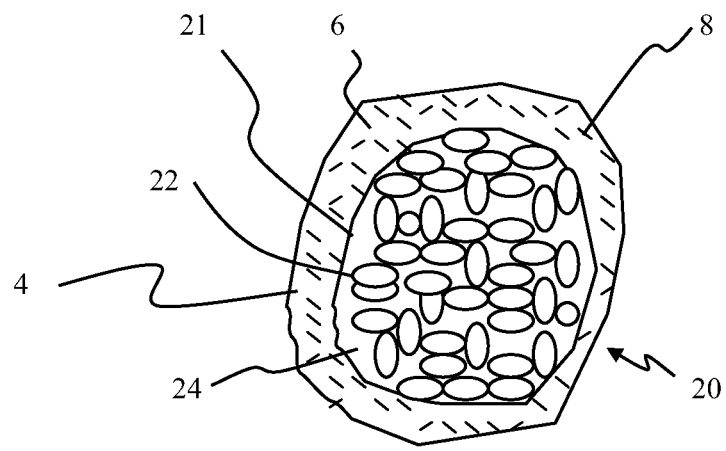
FIG. 3 depicts another embodiment of a coated particle that comprises a substrate, wherein the substrate comprises the composite particle which is an agglomerate of inorganic particles and binder upon which is disposed a resole coating that comprises a reactive powder.

FIG. 3 depicts another embodiment of a coated particle 20 that comprises a substrate 21 and a coating 4 disposed on the substrate 21. The substrate 21 comprises an agglomerate of inorganic particles 22 and binder 24. The coating 4 comprises the reactive powder 8 and continuous curable liquid resin phase 6. If desired a non-reactive powder such as inert inorganic or inert organic filler particles, such as silica flour, may be employed together with or in place of the reactive powder 8. Reactive powders advantageously may improve the unconfined compressive strength of the particle 20. In one embodiment, the addition of a non-reactive powder improves the storage properties of the coated particles.

Figure 4:
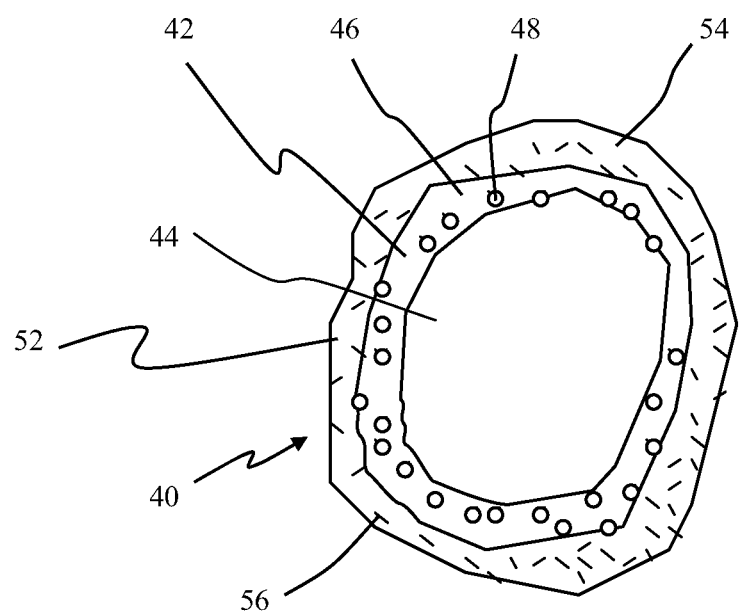
FIG. 4 depicts another embodiment of a coated particle that comprises a substrate, wherein the substrate comprises the hybrid particle comprising a composite layer disposed on an inorganic particulate core, the composite layer comprising a cured organic coating and an inorganic filler upon which is disposed a resole coating that comprises a reactive powder.

FIG. 4 shows another exemplary embodiment comprising a coated particle 40 which comprises a substrate 42 having an inorganic particle 44 as a core and an at least partially cured coating 46 which comprises inorganic or organic fillers 48. A coating 52 is deposited on this substrate 42. Coating 52 comprises a curable liquid resin continuous phase 54 and reactive resin powder 56. If desired a non-reactive powder such as inert inorganic or inert organic filler particles, such as silica flour, may be employed together with or in place of the reactive powder 56. Reactive powders advantageously may improve the unconfined compressive strength of the particle 40. Preferably, the powder 56 comprises a reactive novolak or resole. If desired non-reactive powders (not shown), such as silica flour, may be provided in or on coating 52. In one embodiment, at least a majority of powder in or on the coating 52 comprises reactive resin powder.

A. Single Particle Substrate

As shown, for example, in FIGS. 1 and 2, the substrate may be a single particle. The substrate can be any of the organic or inorganic particulate solid materials normally used as propping agents, gravel pack or for sand control. For example, suitable particulate material, i.e., includes sand, naturally occurring mineral fibers, such as zircon and mullite, ceramic, such as sintered bauxite, or sintered alumina, other non-ceramic refractories such as milled or glass beads, or walnut shells. The substrates can have any desired shape such as spherical, egg shaped, cubical, polygonal, or the like. It is generally desirable for the substrates to be spherical in shape. Substrates can be porous or non-porous. The substrates do not melt at a temperature below 200° F. or 225° F.; typically the substrates do not melt at a temperature below 450° F. or 550° F. The substrate particles are hard and resist deforming or can be deformable. Deforming is different from crushing wherein the particle deteriorates. Optionally the single particle substrate may have an at least partially cured resin coating.

US Patent Application Publication No. 2006/0078682 to McDaniel et al., incorporated herein by reference in its entirety, also discloses particulate substrates, comprising silica and alumina in a silica to alumina weight ratio of about 2.2 to about 5 and a bulk density of less than or equal to about 1 gram per cubic centimeter, suitable for use as a single particle substrate in the present invention.

Examples of other inorganic materials that can be used in the substrate are inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or the like, or a combination comprising at least one of the foregoing inorganic materials. Examples of suitable inorganic materials are metal oxides, metal carbides, metal nitrides, metal hydroxides, metal oxides having hydroxide coatings, metal carbonitrides, metal oxynitrides, metal borides, metal borocarbides, or the like, or a combination comprising at least one of the foregoing inorganic materials. Metallic cations used in the foregoing inorganic materials can be from transition metals, alkali metals, alkaline earth metals, rare earth metals, or the like, or a combination comprising at least one of the foregoing metals.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\alpha$-$Fe_2O_3$, $\gamma$-$Fe_2O_3$, $Fe_3O_4$, or the like), calcium oxide (CaO), manganese dioxide ($MnO_2$ and $Mn_3O_4$), or a combination comprising at least one of the foregoing inorganic oxides. Examples of suitable inorganic carbides include silicon carbide (SiC), titanium carbide (TiC), tantalum carbide (TaC), tungsten carbide (WC), hafnium carbide (HfC), or the like, or a combination comprising at least one of the foregoing carbides. Examples of suitable nitrides include silicon nitrides ($Si_3N_4$), titanium nitride (TiN), or the like, or a combination comprising at least one of the foregoing. Examples of suitable borides are lanthanum boride ($LaB_6$), chromium borides (CrB and $CrB_2$), molybdenum borides ($MoB_2$, $Mo_2B_5$ and MoB), tungsten boride ($W_2B_5$), or the like, or a combination comprising at least one of the foregoing borides. Exemplary inorganic substrates are those that comprise silica and/or alumina.

Other examples of suitable inorganic materials that can be used in the substrate are silica (sand), aeschynite (rare earth yttrium titanium niobium oxide hydroxide), anatase (titanium oxide), bindheimite (lead antimony oxide hydroxide), bixbyite (manganese iron oxide), brookite (titanium oxide), chrysoberyl (beryllium aluminum oxide), columbite (iron manganese niobium tantalum oxide), corundum (aluminum oxide), cuprite (copper oxide), euxenite (rare earth yttrium niobium tantalum titanium oxide), fergusonite (rare earth iron titanium oxide), hausmannite (manganese oxide), hematite (iron oxide), ilmenite (iron titanium oxide), perovskite (calcium titanium oxide), periclase (magnesium oxide), polycrase (rare earth yttrium titanium niobium tantalum oxide), pseudobrookite (iron titanium oxide), members of the pyrochlore group such as, for example, betafite (rare earths calcium sodium uranium titanium niobium tantalum oxide hydroxide), microlite (calcium sodium tantalum oxide hydroxide fluoride), pyrochlore (sodium calcium niobium oxide hydroxide fluoride), or the like, or a combination comprising at least one of the foregoing pyrochlore group members; ramsdellite (manganese oxide), romanechite (hydrated barium manganese oxide), members of the rutile group, such as, for example, cassiterite (tin oxide), plattnerite (lead oxide), pyrolusite (manganese oxide), rutile (titanium oxide), stishovite (silicon oxide), or the like, or a combination comprising at least one of the foregoing rutile group members; samarskite-(Y) (rare earth yttrium iron titanium oxide), senarmontite (antimony oxide), members of the spinel group such as chromite (iron chromium oxide), franklinite (zinc manganese iron oxide), gahnite (zinc aluminum oxide), magnesiochromite (magnesium chromium oxide), magnetite (iron oxide), and spinel (magnesium aluminum oxide), or the like, or a combination comprising at least one of the foregoing spinel group members; taaffeite (beryllium magnesium aluminum oxide), tantalite (iron manganese tantalum niobium oxide), tapiolite (iron manganese tantalum niobium oxide), uraninite (uranium oxide), valentinite (antimony oxide), zincite (zinc manganese oxide), hydroxides, such as, for example, brucite (magnesium hydroxide), gibbsite (aluminum hydroxide), goethite (iron oxide hydroxide), limonite (hydrated iron oxide hydroxide), manganite (manganese oxide hydroxide), psilomelane (barium manganese oxide hydroxide), romeite (calcium sodium iron manganese antimony titanium oxide hydroxide), stetefeldtite (silver antimony oxide hydroxide), stibiconite (antimony oxide hydroxide), or the like, or a combination comprising at least one of the foregoing inorganic materials.

Suitable examples of materials that are modified and used in the substrate are exfoliated clays (e.g., expanded vermiculite), exfoliated graphite, blown glass or silica, hollow glass spheres, foamed glass spheres, cenospheres, foamed slag, sintered bauxite, sintered alumina, or the like, or a combination comprising one of the foregoing materials. Exemplary inorganic substrates may be derived from sand, milled glass beads, sintered bauxite, sintered alumina, mineral fibers such as zircon and mullite, or the like, or a combination comprising one of the inorganic substrates. Hollow glass spheres can be commercially obtained from Diversified Proppants.

Suitable examples of organic materials that are used as the substrate are ground or crushed nut shells, ground or crushed seed shells, ground or crushed fruit pits, processed wood, ground or crushed animal bones, or a combination comprising at least one of the naturally occurring fillers. For example, suitable organic materials are naturally occurring organic fillers comprise crushed or ground walnut, crushed or ground pecan, crushed or ground almond, crushed or ground ivory nut, crushed or ground brazil nut, or a combination comprising at least one of the foregoing nuts. Other examples of suitable organic materials are crushed and ground seeds of plum, crushed and ground seeds of peach, crushed and ground seeds of cherry, crushed or ground olive hulls, crushed and ground seeds of apricot, ground or crushed seed shells maize, processed wood materials from oak, hickory, walnut, poplar and mahogany trees that have been processed by grinding or chipping.

In another exemplary embodiment, the inorganic substrate has a bulk density of about 0.6 to about 1.0 g/cm$^3$ and an apparent density of about 1.3 to about 2.0 g/cm$^3$. The inorganic substrates display a crush test percentage of less than or equal to about 20% when subjected to a crush test at 2000 psi as per API RP 60. The inorganic substrate has a roundness of about 0.6 to about 0.9 and a sphericity of about 0.6 to about 0.9.

The density of the substrate can be chosen depending upon the application for which the proppant is being used. It is desirable to choose substrates that can impart to the proppant an apparent density of 1 to 4 g/cm$^3$. The apparent density is defined as the density of the entire proppant (i.e., the weight per unit volume of the entire material including voids inherent in the proppant). In one embodiment, the substrate has an apparent density of about 1.4 to about 1.9 g/cm$^3$. In another embodiment, the substrate has an apparent density of about 1.5 to about 1.85 g/cm$^3$. In yet another embodiment, the substrate has an apparent density of about 1.6 to about 1.80 g/cm$^3$. An exemplary apparent density for the substrate is about 1.80 g/cm$^3$. Substrates coated with this process, such as sand have an apparent density of +/−2.65 g/cm$^3$ and various forms of ceramics have a density of 2.5-3.4 gm/cc.

B. Composite Particle Substrate

As shown for example in FIG. 3, noted above, the substrate 21 may comprise a deformable composite particle comprising a homogeneous particle comprising fine filler particles 22 held together by a cured or at least partially cured binder 24. Various embodiments of these composite particles are further described below and in U.S. Pat. No. 6,406,789, U.S. Pat. No. 6,632,527 and U.S. Pat. No. 6,582,819, and US Patent Application Publication No. 2006/0078682 to McDaniel et al., all of which are incorporated herein by reference in their entirety.

In such a case, the individual particles that combine to form the substrate can have average particle sizes of about 2 to about 30 micrometers. In one embodiment, the particles that agglomerate to form the substrate 21 may have average particle sizes of less than or equal to about 28 micrometers, or less than or equal to about 25 micrometers, or less than or equal to about 20 micrometers, or less than or equal to about 15 micrometers. Bimodal or higher particle size distributions may be used.

The filler 21 can be particles or fibrous fillers. Fibrous fillers generally have an aspect ratio greater than 1. As used herein, "fibrous" fillers may therefore exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the purpose of this invention. Examples of such fillers well known in the art include those described in "Plastic Additives Handbook, 5$^{th}$ Edition" Hans Zweifel, Ed, Carl Hanser Verlag Publishers, Munich, 2001. Non-limiting examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, iron, nickel, copper. Fibrous fillers such as glass fibers, basalt fibers, including textile glass fibers and quartz may also be included.

Also included are natural organic fibers such as, for example, wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks, or the like, or a combination comprising at least one of the foregoing.

In addition, synthetic reinforcing fibers may be used in the composite substrate. This includes organic materials capable of forming fibers such as phenolic fibers, polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers such as those commercially available from Du Pont de Nemours under the trade name KEVLAR, polybenzimidazole, polyimide fibers such as those available from Dow Chemical Co. under the trade names POLYIMIDE 2080® and PBZ® fiber, polyphenylene sulfide, polyether ether ketone, polyimide, polybenzoxazole, aromatic polyimides or polyetherimides, and the like. Combinations of any of the foregoing fibers may also be used. Exemplary fibers are phenolic resin fibers.

In an exemplary embodiment, phenolic resin fiber or glass fibers can be used as the fibrous filler in the composite substrate. Useful glass fibers can be formed from any type of fiberizable glass composition and include those prepared from fiberizable glass compositions commonly known as "E-glass," "A-glass," "C-glass," "D-glass," "R-glass," "S-glass," as well as E-glass derivatives that are fluorine-free and/or boron-free. AR-glass can be used for its alkali resistance. Commercially produced glass fibers generally having nominal filament diameters of about 4.0 to about 35.0 micrometers, and most commonly produced E-glass fibers having nominal filament diameters of about 9.0 to about 30.0 micrometers may be included in the composite substrate. Use of non-round fiber cross sections are also possible. The glass fibers may be sized or unsized. Sized glass fibers can be coated on at least a portion of their surfaces with a sizing composition selected for compatibility with the coating that is disposed upon the substrate. The sizing composition facilitates wet-out and wet-through of the coating upon the fiber strands and assists in attaining desired physical properties in the composite.

The glass fibers are preferably glass strands that have been sized. In preparing the glass fibers, a number of filaments can be formed simultaneously, sized with a silane coating agent and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt %, and more typically ranges from about 0.1 to 2 wt % based on the weight of the glass fibers. Generally, this may be about 1.0 wt % based on the weight of the glass filament. Glass fibers in the form of chopped strands about one-fourth inch long or less and preferably about one-eighth inch long may also be used. They may also be longer than about one-fourth inch in length if desired.

Fibers used in the composite substrate can have lengths of about 6 to about 3200 μm. In one embodiment, fiber lengths are about 10 to about 1600 μm. In another embodiment, fiber lengths are about 10 to about 800 μm. Exemplary fibers are shorter than the greatest diameter of the composite substrate.

Fiber diameters (or, for fibers of non-circular cross-section, a hypothetical dimension equal to the diameter of a hypothetical circle having an area equal to the cross-sectional area of the fiber) are about 1 to about 20 μm. Aspect ratio (length to diameter ratio) can be in amounts of about 5 to about 175. The fiber may have a round, oval, square, rectangular or other appropriate cross-section. The fibers may be straight, crimped, curled or a combination thereof.

An exemplary filler used in the organic coating is silica flour. The silica flour generally has particle sizes of less than or equal to about 20 micrometers. In one embodiment, the silica flour has particle sizes of less than or equal to about 10 micrometers. In another embodiment, the silica flour has particle sizes of less than or equal to about 5 micrometers. An example of commercially available silica flour is SIKRON® SF 242 commercially available from Quarzwerke GmbH, Frechen, Germany.

C. Hybrid Particle Substrate

As shown in FIG. 4, another type of substrate is a hybrid particle substrate 42 having an inorganic particle 44 as a core and a cured or at least partially cured coating (composite layer) 46 which comprises inorganic fillers or organic fillers 48. The organic coating 46 can be applied in a single layer or in multiple layers if desired.

The fillers 48 in the composite layer 46 of the hybrid particle substrate 42 may be the same as described above for the composite particle substrate.

Various embodiments of these hybrid particles are further described in U.S. application Ser. No. 11/230,693 filed Sep. 20, 2005, and US Patent Application Publication No. 2006/0078682 A1 to McDaniel et al., all of which are incorporated herein by reference in their entirety.

In the exemplary embodiment of FIG. 4 when the substrate of the coated particle comprises a single particle, an exemplary synthetically produced, inorganic substrate comprises one or more of silica ($SiO_2$), alumina ($Al_2O_3$), titanium dioxide ($TiO_2$), ferric oxide ($Fe_2O_3$), calcium oxide (CaO), magnesium oxide (MgO), potassium dioxide ($K_2O$) and sodium oxide ($Na_2O$). The inorganic substrate can also comprise sulfite ions, chloride ions, water, and carbon dioxide in trace amounts of less than or equal to about 2 wt %, based on the weight of the substrate.

Synthetically produced organic substrates can comprise thermoplastic polymers, thermosetting polymers, or a combination comprising a thermosetting polymer and a thermoplastic polymer. Examples of suitable organic materials that can be used as the substrate are polymer precursors (e.g., low molecular weight species such as monomers, dimers, trimers, or the like), oligomers, polymers, copolymers such as block copolymers, star block copolymers, terpolymers, random copolymers, alternating copolymers, graft copolymers, or the like; dendrimers, ionomers, or the like, or a combination comprising at least one of the foregoing. When the substrate comprises a thermosetting polymer, it is desirable for the organic materials to undergo curing (crosslinking) upon the application of either thermal energy, electromagnetic radiation, or a combination comprising at least one of the foregoing. Initiators may be used to induce the curing. Other additives that promote or control curing such as accelerators, inhibitors, or the like, can also be used.

Examples of suitable thermosetting polymers for use in the cured (non-reactive) coating layer 46 of the substrate are epoxies, acrylate resins, methacrylate resins, phenol-formaldehydes, epoxy-modified novolacs, furans, urea-aldehydes, melamine-aldehydes, polyester resins, alkyd resins, phenol formaldehyde novolacs, phenol formaldehyde resoles, phenol-aldehydes, resole and novolac resins, epoxy modified phenolics, polyacetals, polysiloxanes, polyurethanes, or the like, or a combination comprising at least one of the foregoing thermosetting polymers.

D. Curable Outer Layer Resins and Powders

The outer organic coating comprises a curable liquid resin polymer as a continuous phase and a reactive and/or non-reactive powder. By outer organic coating is meant the outermost continuous phase resin coating of the particle and any powder embedded or protruding from the continuous phase.

The outer coating curable liquid resins of the present invention are low viscosity liquid resins which are able to be coated onto a substrate at low temperatures, from about 50° F. (10° C.) to about 150° F. (66° C.), preferably about 70° F. (21° C.) to about 120° F. (49° C.), as described elsewhere in this specification and exhibit latency or cure to deliver full performance when applied in the subterranean formation. However, they are not cold set resins which can react at a temperature of 65° C. or less without the use of additional heat. The latency associated with the use of these resole coating resins is a feature which distinguishes these resole resins from cold set resins such as, for example, the cold set resins, e.g., alkaline modified resoles, described in US patent application publication no. 2006/0078682 A1 to McDaniel et al., paragraph 0043. Alkaline modified resole is made by adding potassium hydroxide or sodium hydroxide to resole resin such that a sufficient portion of the resin is converted to an alkaline salt of the resin which is capable of being cured by treating with esters without elevated temperature. The outer coating resoles employed in the present invention do not contain these alkaline salts. The outer coating resole resins of the present invention are latent but heat curable such that they can be cured by the elevated (above 70° C., typically above 80° C.) temperatures found in a subterranean formation.

The reactive powders comprise one or more of the following: novolak (with or without hexamethylenetetramine), resoles, hydroxy functional polyesters (reactive with resoles), hydroxy functional polyacrylates (reactive with resoles), and functionalized polyurethanes that will be reactive with resoles, such as those having an amine functionality or a hydroxy functionality. The reactive powders may also comprise epoxy resins. Typically, the reactive powder has an average particle size of about 200 mesh (74 microns) or smaller.

The non-reactive powders may be any inorganic or organic powders which are not chemically reactive with the continuous curable liquid resin coating. Examples of inorganic non-reactive powders include silica flour or ground glass or minerals. Examples of non-reactive organic powders include crushed nut shells or other natural organic materials such as, for example, wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks, or the like, or a combination comprising at least one of the foregoing. Typically the non-reactive powder has an average particle size of about 200 mesh (74 microns) or smaller.

1. Resole Resins

An embodiment of the present invention employs a coating which includes phenol-aldehyde resole polymer provided as a solution or a dispersion. Resole resin may also be used as powder for embedding or adhering to the resole-containing coating. Typically the resole powder has an average particle size of about 200 mesh or smaller and is recovered via spray dried techniques to retain the reactivity of the resole.

Resoles include phenol formaldehyde resoles, phenol formaldehyde and furfuryl alcohol or furfuryl aldehyde resoles, or phenol formaldehyde resole resins substituted with alkylphenols or cashew nut oil. Solvent borne and aqueous resoles are included.

The resole resin used for the coating is liquid when applied to the substrate and thus has a molecular weight suitable to be a liquid. A typical molecular weight average for liquid resole ranges from about 400 to about 2000. The coating resin is curable. The coating resole resins are supplied as a wet aqueous solution and are dried by the present process to be in an uncured (non-cross-linked) state. A preferred example of a resole is manufactured by Hexion Specialty Chemicals, Inc. and is designated as OWR-262E.

The resole resin used for the powder is solid when applied to the coated substrate and thus has a molecular weight suitable to be a solid. A typical molecular weight average for solid resole ranges from about 500 to about 5000. The powder resole is curable. The resole powder may be applied in an uncured state. Preferably the resole powder to be reactive towards itself and the liquid resole adhesive (uncured when applied).

Preferably the resole resins are low free phenol resole resins having less than 3 wt. %, more preferably less than 2 wt. % free phenol.

The phenol-aldehyde resole resin has a phenol:aldehyde molar ratio from about 1:1 to about 1:3, typically from about 1:1 to about 1:1.95. A preferred mode of preparing the resole resin is to combine phenol with a source of aldehyde such as formaldehyde, acetaldehyde, propionaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. A typical way to make resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation. Elasticizers or plasticizers, such as bisphenol A or cashew nut oil, may also be present to enhance the binder elasticity or plasticity. Other known additives may also be present.

The resoles may be conventional resoles or modified resoles. Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol. Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Phenols and aldehydes suitable for preparing the modified orthobenzylic ether-containing phenolic resole resins are generally any of the phenols and aldehydes which may be utilized in the formation of phenolic resins. Metal ion catalysts useful in production of the modified phenolic resins include salts of the divalent ions of Mn, Zn, Cd, Mg, Co, Ni, Fe, Pb, Ca and Ba. Tetra alkoxy titanium compounds of the formula $Ti(OR)_4$ where R is an alkyl group containing from 3 to 8 carbon atoms, are also useful catalysts for this reaction. A preferred catalyst is zinc acetate.

A molar excess of aldehyde per mole of phenol is used to make the modified resole resins. Preferably the molar ratio of phenol to aldehyde is in the range of from about 1:1.1 to about 1:2.2. The phenol and aldehyde are reacted in the presence of the divalent metal ion catalyst at pH below about 7. To the reaction mixture is added an aliphatic hydroxy compound which contains two or more hydroxy groups per molecule. The hydroxy compound is added at a molar ratio of hydroxy compound to phenol of from about 0.001:1 to about 0.03:1.

Useful hydroxy compounds which contain two or more hydroxy groups per molecule are those having a hydroxyl number of from about 200 to about 1850. The hydroxyl number is determined by the standard acetic anhydride method and is expressed in terms of mg KOH/g of hydroxy compound. Suitable hydroxy compounds include ethylene glycol, propylene glycol, 1,3-propanediol, diethylene glycol, triethylene glycol, glycerol, sorbitol and polyether polyols having hydroxyl numbers greater than about 200.

After the aliphatic hydroxy compound containing two or more hydroxy groups per molecule is added to the reaction mixture, heating is continued until from about 80% to about 98% of the aldehyde has reacted. The modified phenolic resole may be "capped" to be an alkoxy modified phenolic resole resin. In capping, a hydroxy group is converted to an alkoxy group by conventional methods that would be apparent to one skilled in the art given the teachings of the present disclosure.

Resoles also include a terpolymer of phenol, furfuryl alcohol (or furfuryl aldehyde) and formaldehyde.

A phenol-formaldehyde-furfuryl alcohol terpolymer is prepared from the catalytic reaction of phenol, formaldehyde and furfuryl alcohol, wherein the catalyst is a water soluble multivalent metal salt, and wherein the reaction is carried out under essentially hydrous conditions. The common water soluble salts of multivalent metal ions which can be used as the catalyst in the present invention are less costly than the organic solvent soluble salts at equal equivalents of metal ion that are used in the process disclosed in U.S. Pat. No. 4,255,554 to Wuskell. The use of a water soluble multivalent metal salt eliminates the necessity for controlling the reaction pH in the manner necessary with an acid catalyst. However, the multivalent metal salt catalyzed reaction must be operated at a pH of less than 7.0. When uncontaminated phenol, formalin, furfuryl alcohol and zinc or lead acetate are mixed in the proper proportions, the pH is always less than 7.0.

The water soluble multivalent metal salts used as the catalysts to make this terpolymer include the multivalent ions of manganese, zinc, cadmium, magnesium, cobalt, nickel, tin, copper, iron, lead, and calcium. Preferred catalysts are zinc acetate or lead acetate, and mixtures thereof.

The terpolymer reaction can be carried out by initially reacting furfuryl alcohol and formaldehyde at temperatures of about 85° to 105° C., at atmospheric pressure, then adding phenol and continuing the reaction to a viscosity of about 100 to 10,000, preferably about 200 to 5,000 centipoises, measured at a temperature of about 25° C. However, the reaction can be conducted at elevated temperatures of up to about 140°

C. in pressurized reaction vessels, taking care to ensure that the reaction mixture does not boil under these elevated conditions. The reaction can also be carried out by initially reacting phenol and formaldehyde, then adding the furfuryl alcohol and continuing the reaction to a viscosity of about 100 to 10,000 cps, preferably about 200 to 5,000 cps, measured at about 25° C. Alternatively, the reaction can be carried out by reacting phenol, furfuryl alcohol and formaldehyde simultaneously in the presence of the water soluble multivalent metal salt catalysts. The resulting phenol-formaldehyde-furfuryl alcohol terpolymer can be used as is or diluted with any suitable solvent, including furfuryl alcohol or water.

In general, the mole ratio of phenol to furfuryl alcohol can vary from about 0.1:1 to about 10:1, respectively. The mole ratio of formaldehyde to phenol+furfuryl alcohol can vary from about 0.5:1 to 2:1, respectively in moles of $CH_2O$:phenol+furfuryl alcohol. The amount of catalyst can vary from about 0.2% to about 8% by weight of the total amount of phenol and furfuryl alcohol.

Although the reaction has been described in terms of formaldehyde, other aldehydes of the general formula: R—CHO can also be used, wherein R is a hydrocarbon radical containing about 1-8 carbon atoms such as acetaldehyde, propionaldehyde, furfuraldehyde, paraformaldehyde, the solid low molecular weight polymer of formaldehyde, and the like. The preferred form of formaldehyde is in the hydrous state, such as formalin.

Furfuryl alcohol or substituted furfuryl alcohol compounds can be used with the formula I:

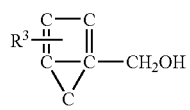

where $R^3$ can be an alkyl, aryl, alkenyl, alkylol, alkoxy, aryloxy, halogen, hydrogen or hydroxy radical. The preferred compound is furfuryl alcohol.

In addition, although phenol is the preferred phenolic reactant, other substituted phenols can also be used, especially those phenols having the formula II:

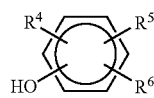

wherein $R^4$, $R^5$ and $R^6$ can independently be hydrogen, hydrocarbon radicals, oxyhydrocarbon radicals, hydroxy radicals or halogen, and substituted such that either the two ortho, one ortho and the para, or the two ortho and the para positions are unsubstituted. In general, the phenols that can be used are those which are suitable for making phenolic resins. Some examples are o-cresol, m-cresol, p-cresol, octyl phenol, nonyl phenol, 3,5-dimethoxy phenol, p-tert-butylphenol, p-butoxyphenol, resorcinol, 3,5-xylenol, 3-5-diethylphenol, catechol, 3,5-dibutylphenol and the like.

After being applied as coatings, these terpolymers may be cured with curatives such as acid catalyst such as ammonium chloride or ammonium sulfate. Terpolymers are also disclosed by U.S. Pat. No. 7,153,575 granted Dec. 26, 2006, incorporated herein by reference.

If desired the resole or resole powder may contain a curative, for example hexamethylenetetramine.

2. Polyester and Unsaturated Polyester Resins

Another embodiment of this invention employs a coating which includes a liquid polyester or an unsaturated polyester resin as the continuous phase. Polyester or an unsaturated polyester resin may also be used as a reactive powder for embedding or adhering to the continuous phase.

The term "polyester", as used herein, encompasses both "homopolyesters" and "copolyesters" and means a synthetic polymer prepared by the polycondensation of difunctional carboxylic acid with at least one difunctional hydroxyl compound, e.g., a diol or glycol component. Typical polyesters are those containing unsaturated (vinyl) endgroups which cure through the use of peroxide catalysts. These polyesters may be blended with other monomers to incorporate a desired property. Polymerization catalysts such as benzoyl peroxide may also use metal catalysts to accelerate cure, such as cobalt salts.

In one embodiment, the polyester resins useful as a reactive powder include hydroxy functional polyacrylates reactive with resoles. In another embodiment, the reactive powder includes polyhydroxy polyesters. Polyhydroxy polyester polymers (functionality of 2 or more) result from the reaction of polycarboxylic acids or anhydrides (typically isophthalic acid, phthalic acid or anhydride, maleic acid or anhydride, fumaric acid, sebacic acid, azelaic acid, adipic acid, trimellitic acid or anhydride, etc.) with polyhydroxy substances such as ethylene glycol, propylene glycol, neopentyl glycol, butylene glycol, 1,4-butanediol, hexylene glycol, 1,6-hexanediol, the polyglycols such as diethylene glycol or triethylene glycol, etc., the triols such as glycerine, trimethylol ethane, trimethylol propane, etc. and other higher functional alcohols such as pentaerythritol, sorbitol, mannitol, and the like. Polyhydroxy polyesters are further described in U.S. Pat. No. 4,920,199 incorporated herein by reference. Optimization of the melt/flow properties of the resin and powder combination is beneficial for storage and performance of the coated proppant.

3. Acrylic Polymers

Another embodiment of the present invention utilizes liquid acrylic polymers as the continuous phase. Acrylic polymer resins may also be used as a reactive powder for embedding or adhering to the continuous phase.

Acrylate polymers (solutions and dispersions thereof) for use as a curable liquid resin in the continuous phase are polymers commonly called acrylics, polyacrylates, or acrylate polymers. Some acrylate monomers (the components of the polymers) used to form acrylate polymers may be acrylic acid, butyl acrylate, 2-ethylhexyl acrylate, methyl acrylate, ethyl acrylate, acrylonitrile, n-butanol, methyl methacrylate, 2-hydroxyethyl acrylate, 2-hydroxypropyl acrylate and TMPTA. The acrylate ion ($CH_2$=$CHCOO^-$) is the ion of acrylic acid. Acrylates are the salts and esters of acrylic acid. They are also known as propenoates (since acrylic acid is also known as 2-propenoic acid). Acrylates contain vinyl groups, that is, two carbon atoms double bonded to each other, directly attached to the carbonyl carbon. Acrylates and methacrylates (the salts and esters of methacrylic acid) are common monomers in acrylate polymers. Others monomers common to acrylate polymers (styrene) may also be incorporated.

In one embodiment, the acrylates useful as a reactive powder include hydroxy functional polyacrylates or amine functional polyacrylates, reactive with resoles. Optimization of the melt/flow properties of the resin and powder combination is beneficial for storage and performance of the coated proppant.

4. Urethane Resins

Another embodiment of this invention employs a coating which includes a liquid urethane resin as the continuous phase. Urethane resins may also be used as a reactive powder for embedding or adhering to the continuous phase.

Polyurethane resins are made by mixing a polyisocyanate component, a polyhydroxy component or a polyamine component and a catalyst. Typically the polyhydroxy component is a polyhydroxy phenolic component dissolved in solvent. The polyamine component can be multifunctional and selected to produce still reactive, oligomerized liquid polyurethanes (solutions and dispersions thereof). Generally the solvents are mixtures of hydrocarbon and polar organic solvents such as organic esters.

The polyhydroxy component is generally a phenolic resole resin or alkoxy modified resole resin as described above.

The isocyanate component may vary widely and has a functionality of 2 or more. As defined herein, polyisocyanates include isocyanates having such functionality of 2 or more, e.g., diisocyanates, triisocyanates, etc. Exemplary useful isocyanates are organic polyisocyanates such as tolylene-2,4-diisocyanate, tolylene-2,6-diisocyanate, and mixtures thereof, particularly crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4"-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general Formula VI:

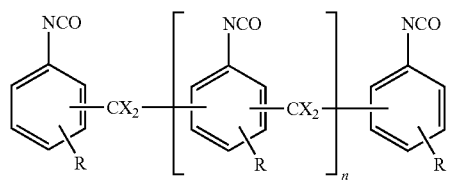

VI wherein R is selected from the group consisting of hydrogen, chlorine, bromine, and alkyl groups having 1 to 5 carbon atoms; X is selected from the group consisting of hydrogen, alkyl groups having 1 to 10 carbon atoms and phenyl; and n has an average value of generally about 0 to about 3. The preferred polyisocyanate may vary with the particular system in which the powder is employed. Urethanes are disclosed, for example, by U.S. Pat. No. 5,733,952 to Geoffrey.

Exemplary hydrocarbon solvents include aromatic hydrocarbons such as benzene, toluene, xylene, ethyl benzene, high boiling aromatic hydrocarbon mixtures, heavy naphthas and the like. Optimization of the melt/flow properties of the resin and powder combination is beneficial for storage and performance of the coated proppant.

5. Epoxy Resins

Another embodiment of this invention employs a coating which includes a liquid epoxy resins (solutions and dispersions thereof) as the continuous phase. Epoxy resins may also be used as a reactive powder for embedding or adhering to the continuous phase.

Epoxy resins are commercially available and prepared from either glycidyl materials such as the ethers, produced by the reaction of chlorohydrin with a phenol or alcohol, or epoxies, such as the product from the reaction of peracetic acid with a linear or cycloaliphatic olefin. The epoxy resin molecule is characterized by the reactive epoxy or ethoxline groups of Formula I:

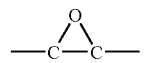

which serve as terminal linear polymerization points. Crosslinking or curing is accomplished through these groups or through hydroxyls or other groups present. The well-known epoxy resins are usually prepared by the base-catalyzed reaction between an epoxide, such as epichlorohydrin and a polyhydroxy compound, such as bisphenol A. Suitable cationic curable epoxides include monocycloaliphatic epoxides and biscycloaliphatic epoxides.

In one embodiment, the epoxy resins can be selected from glycidyl ethers made from bisphenol A and epichlorohydrin. In another embodiment, the liquid epoxy resin has a typical viscosity of about 200 to about 20,000 centipoises, and an epoxide equivalent weight of about 170 to about 500 and weight average molecular weight of about 350 to about 4000. Liquid epoxy resin products include, for example EPON 815 epoxy resin, commercially available, from Hexion Specialty Chemicals Inc.

In one embodiment, epoxy resins may be converted to thermoset solids by a variety of crosslinking mechanisms. The curatives, or curing agents, used to complete the conversion can be truly catalytic or multifunctional crosslinking agents that become chemically bound in the final three-dimensional structure. Curing agents include, but are not limited to, 1) alkaline curing agents, such as Lewis bases, primary and secondary aliphatic amines, amine adducts, cyclic amines, aromatic amines, polyamides, and other amines, such as dicydiandiamide and imidazoles; 2) acid curing agents, such as Lewis acids, phenols, organic acids, cyclic anhydrides, polysulfides and mercaptans. The preferred curing agent for use in this technology is Sigma Aldrich's tetrafluoroboric acid (48% solution in water).

Powder epoxy resins include, for example, EPON 2008, commercially available Hexion Specialty Chemicals Inc. Optimization of the melt/flow properties of the resin and powder is beneficial for storage and performance of the coated proppant.

6. Melamine Resins

Another embodiment of this invention utilizes a liquid melamine resins as the continuous phase. Melamine resins, with or without free methylol groups, are capable of curing, and may be accelerated by heat and or acids. Melamine resins without free methylol have —OR groups rather than —OH groups. Thus, for example, the unreacted, uncured, A-stage melamine resin can be coated onto substrates, providing the adhesive and reactive continuous phase to produce a tacky or high solids surface on the substrate. The continuous, reactive liquid phase can then function to adhere reactive dry powders to the surface, and the combination will then be heat cured when placed into the downhole fracture where the components react and result in amino methyl linkages. Astro Mel 601 (TM-Hexion Specialty Chemicals) is a material of choice for this type of application because of the high solids composition with low viscosity, water insolubility, and stability.

An example of another melamine resin is Astro Mel NW-3A (TM-Hexion Specialty Chemicals), comprising a liquid, partially methylated melamine resin. It is particularly useful to crosslink hydroxyl-functional polymers (reactive powders) and capable of self condensing to provide excellent coating properties. The balance of —OH groups and —OR groups on this melamine resin can be adjusted to provide the optimum coating performance, depending on the total requirements of the liquid adhesive resin and powder resin combinations which produce the final coating on the substrate.

7. Anhydride Resins

Another embodiment of this invention utilizes a liquid anhydride resin as the continuous phase. Styrene maleic anhydride, also known as SMA or SMAnh, is an example of an anhydride resin polymer, and is composed of styrene and maleic anhydride monomers. The monomers are built in randomly making it a random copolymer, formed by a radical polymerization using an organic peroxide as the initiator. The main characteristics of SMA copolymer are its transparent appearance, high heat resistance, high dimensional stability, and the specific reactivity of the anhydride groups. The latter feature results in the solubility of SMA in alkaline (water-based) solutions and dispersions. SMA is available in a broad range of molecular weights and maleic anhydride (MA) contents. Low molecular weight oligomers are available (and converted to solutions and dispersions) that will function as the reactive adhesive layer on the substrates to provide a reactive coating that adheres the powder selected for the application. The unique chemistry of SMA allows a wide range of choices for the selection of the reactive powder to be used for the coating of the substrates. The solubility of SMA in alkaline solutions makes it suitable for various applications in the field of sizings (paper), binders and coatings. The specific reactivity of SMA makes it a suitable agent for compatibilizing normally incompatible polymers.

8. Novolak Polymer-Containing Resins

An embodiment of the present invention employs powder which includes phenol-aldehyde novolak polymer.

The novolak may be any novolak employed with proppants. The novolak may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, or para-toluenesulfonic acid. An alternative way to make novolaks is to react a phenol and an aldehyde in the presence of divalent inorganic salts such as zinc acetate, zinc borate, manganese salts, cobalt salts, etc. The selection of catalyst may be important for directing the production of novolaks which have various ratios of ortho or para substitution by aldehyde on the phenolic ring, e.g., zinc acetate favors ortho substitution. Novolaks enriched in ortho substitution, i.e., high-ortho novolaks, may be preferred because of greater reactivity in further cross-linking for polymer development. High ortho novolaks are discussed by Knop and Pilato, *Phenolic Resins*, p. 50-51 (1985) (Springer-Verlag) incorporated herein by reference. High-ortho novolaks are defined as novolaks wherein at least 60% of the total of the resin ortho substitution and para substitution is ortho substitution, preferably at least about 70% of this total substitution is ortho substitution.

The novolak polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred.

Preferably the novolak resins are low free phenol novolak resins having less than 1 wt. %, more preferably less than 0.6 wt. % free phenol.

The molecular weight of the novolak will vary from about 500 to 10,000, preferably 1,000 to 5,000 depending on their intended use. The molecular weight of the novolaks or other polymers in this description of the present invention are on a weight average molecular weight basis unless otherwise indicated. High-ortho novolak resins are especially preferred.

The novolak resin compositions typically comprise at least 10 weight percent novolak polymer, preferably at least about 20 weight percent novolak polymer, most preferably about 50 to about 70 weight percent novolak polymer. The remainder of the resin composition could include crosslinking agents, modifiers or other appropriate ingredients. The phenolic moiety of the novolak polymer is selected from phenols of Formula III or bisphenols of Formula IV, respectively:

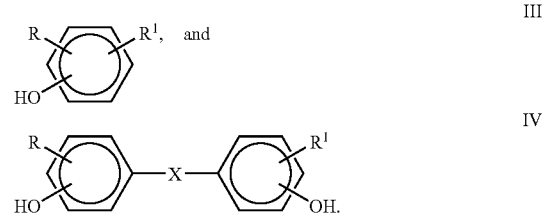

R and $R^1$ are independently alkyl, aryl, arylalkyl or H. In Formula III, R and $R^1$ are preferably meta to the respective hydroxy group on the respective aromatic ring. Unless otherwise defined, alkyl is defined as having 1 to 6 carbon atoms, and aryl is defined as having 6 carbon atoms in its ring. In Formula IV, X is a direct bond, sulfonyl, alkylidene unsubstituted or substituted with halogen, cycloalkylidene, or halogenated cycloalkylidene. Alkylidene is a divalent organic radical of Formula V:

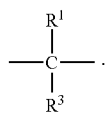

When X is alkylidene, $R^1$ and $R^3$ are selected independently from H, alkyl, aryl, arylalkyl, halogenated alkyl, halogenated aryl and halogenated arylalkyl. When X is halogenated alkylidene, one or more of the hydrogen atoms of the alkylidene moiety of Formula V are replaced by a halogen atom. Preferably the halogen is fluorine or chlorine. Also, halogenated cycloalkylidene is preferably substituted by fluorine or chlorine on the cycloalkylidene moiety.

A typical phenol of Formula III is phenol, per se. Typical bisphenols of Formula IV include Bisphenol A, Bisphenol C, Bisphenol E, Bisphenol F, Bisphenol S, or Bisphenol Z.

The novolak polymers may contain any one of the phenols of Formula III, bisphenols of Formula IV, or combinations of one or more of the phenols of Formula III and/or one or more of the bisphenols of Formula IV.

For practical purposes, phenolic novolaks do not harden upon heating, but remain soluble and fusible unless a hardener (curing agent) is present. Thus, in curing a novolak resin, a curing agent is used to overcome the deficiency of alkylenebridging groups to convert the resin to an insoluble infusible condition. Appropriate crosslinking agents include hexamethylenetetramine (HEXA), paraformaldehyde, oxazolidines, melamine resin or other aldehyde donors and/or the above-described resole polymers. Each of these crosslinkers can be used by itself or in combinations with other crosslinkers. The resole polymer may contain substituted or unsubstituted phenol. An example of a preferred novolak powder is DURITE SD-536C, commercially available from Hexion Specialty Chemicals, Inc. This powdered novolak contains 10 weight percent HEXA as its sole curing agent.

A novolak resin powder composition of this invention typically comprises up to about 25 weight percent HEXA and/or up to about 90 weight percent resole polymers based on the total weight of coating composition. Where HEXA is the sole crosslinking agent, the HEXA comprises from about 5 to about 25 weight percent of the resin. Where the phenol-aldehyde resole polymer is the sole crosslinking agent, the resin contains from about 20 to about 90 weight percent of the resole polymer. The composition may also comprise combinations of these crosslinkers. To make phenolic novolak polymers with one or more phenols of Formula III, the phenol is mixed with acidic catalyst and heated. Then an aldehyde, such as a 50 weight % solution of formaldehyde is added to the hot phenol and catalyst at elevated temperature. Water made by the reaction is removed by distillation to result in molten novolak. The molten novolak is then cooled and flaked and ground to a powder.

To make novolak polymers with bisphenols of Formula IV, the bisphenol is mixed with a solvent, such as n-butyl acetate, at elevated temperature. An acid catalyst such as oxalic acid or methane sulfonic acid is then added and mixed with the bisphenol and then an aldehyde, typically formaldehyde, is added. The reactants are then refluxed. It is noted that the preparation of the novolak resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

The novolak polymer may optionally be further modified by the addition of VINSOL®, epoxy resins, bisphenol, waxes, or other known resin additives. One mode of preparing an alkylphenol-modified phenol novolak polymer is to combine an alkylphenol and phenol at a molar ratio above 0.05:1. This combination is reacted with a source of formaldehyde under acidic catalysis, or divalent metal catalysis (e.g., Zn, Mn). During this reaction, the combination of alkylphenol and phenol is present in molar excess relative to the formaldehyde present.

If desired, phenol-aldehyde novolaks or bisphenol-aldehyde novolaks may be modified by reacting these novolaks with an additional quantity of aldehyde using a basic catalyst. Typical catalysts used are sodium hydroxide, potassium hydroxide, barium hydroxide, calcium hydroxide (or lime), ammonium hydroxide and amines. In the case of phenol-aldehyde polymers or bisphenol-aldehyde polymers, the molar ratio of added aldehyde to phenolic moiety, based on the phenolic moiety monomeric units in the novolak, ranges from 0.4:1 to 3:1, preferably from 0.8:1 to 2:1. This achieves a crosslinkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation. These polymers can be used alone or with other polymers, such as phenol-aldehyde novolaks, bisphenol-aldehyde novolak, or combinations thereof, as a crosslinking agent, or as a component of crosslinking agents. When the aldehyde-modified polymers are employed as crosslinking agents, they may be used with other typical crosslinking agents such as those described above for novolak polymers.

In one embodiment, the novolac resins may be those having melting points above 80° C., and preferably in the range from 80° C. to 130° C. Even though lower melt point resins can be used, such resins may produce an undesirable tendency to lead to caking in the final product. In general, the higher the melting point, the lower the tendency to cake. Melting points as high as 150° C. to 180° C. can be used, but could be associated with penalties of increased energy costs and difficulties in processing and handling. Such resins may also generate a lower bonding strength at downhole temperatures. Optimization of the melt/flow properties of the curable resin and powder combination is beneficial for storage and performance of the coated proppant.

In another embodiment, the novolac resins may be those having softening onset points, as measured by TMA, above 170° F., and preferably in the range from 170° F. to 240° F. In general, the inventors have determined that the higher the softening onset point of the resin, the lower the tendency of the coated particle to cake. Novolac resins having softening onset points as high as 240° F. to 300° F. can be used, but increased energy costs and difficulties in processing and handling the final product may be incurred. Optimization of the softening/flow properties of the curable resin and powder combination is beneficial for storage and performance of the coated proppant.

E. Additives

Additives are used for special cases for special requirements. The resin coatings of the invention may include a wide variety of additive materials.

The resin coating may include one or more other additives such as a coupling agent, typically added to the liquid resin or applied to the substrate prior to the addition of the liquid resin used to form the continuous layer, such as a silane to promote adhesion of the coating to substrate.

Such coupling agents include, for example, organo silanes which are known coupling agents. Examples of useful coupling agents of this type include amino silanes, epoxy silanes, mercapto silanes, hydroxy silanes and ureido silanes. The use of organofunctional silanes as coupling agents to improve interfacial organic-inorganic adhesion is especially preferred. These organofunctional silanes are characterized by the following formula VII:

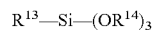

$$R^{13}\text{—Si—}(OR^{14})_3 \qquad \text{VII,}$$

where $R^{13}$ represents a reactive organic function and $OR^{14}$ represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane) is an example. The silane can be premixed with the resin or added to the mixer separately.

The organic coating can optionally contain additives such as silicone lubricants, surfactants, wetting agents, dyes, pigments, flow modifiers (such as flow control agents and flow enhancers), hardeners, crosslinking agents, foaming agents, initiators, thermal stabilizers, light stabilizers, antioxidants, flame retardants, anti-drip agents, antiozonants, stabilizers, anti-corrosion additives, mold release agents, fillers, antistatic agents, waxes, dyes and the like, or combination comprising at least one of the foregoing. One particularly useful additive to aid in the coating process is XIAMETER PMX-200, 350 cs, a silicone lubricant commercially available from Dow Corning Corporation.

The surfactants may be anionic, nonionic, cationic, amphoteric or mixtures thereof. Certain surfactants also operate as flow control agents. Other additives include humidity resistant additives or hot strength additives. Of course, the additives may be added in combination or singly.

If desired, the organic coating can optionally contain an anti-dusting additive thermoplastic elastomer to reduce the creation of dust relative to a particle which is the same except for lacking the thermoplastic elastomer. Some anti-dusting additives include ethylene, butylacrylate copolymers (such as ENABLE copolymers commercially available from Exxon-Mobil Corporation). Other examples exist, such as NBR (rubber) modified novolaks and resoles that can function as "impact modifiers."

If desired, the organic coating can optionally contain an impact modifier. An impact modifier can impart elastic properties to the organic coating. Suitable impact modifiers include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers or a combination comprising at least one of the foregoing.

A particularly useful class of impact modifiers comprises the AB (diblock) and ABA (triblock) copolymers and core-shell graft copolymers of alkenylaromatic and diene compounds, especially those comprising styrene and either butadiene or isoprene blocks. The conjugated diene blocks may be partially or entirely hydrogenated, whereupon they may be represented as ethylene-propylene blocks and the like and have properties similar to those of olefin block copolymers. Examples of suitable triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(a-methylstyrene)-polyisoprene-poly(α-methylstyrene).
Particularly preferred triblock copolymers are HYCAR, commercially available from Noveon, or KRATON D, and KRATON G, commercially available from Kraton Polymers LLC.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers, thermoplastic ether-ester elastomers, and the like, as well as mixtures comprising any one of the foregoing. A suitable impact modifier amongst the ionomer resins is SURLYN® available from Du Pont.

When multiple layers are used in the organic coating, the impact modifiers may be used in any of the layers. It is generally desirable to use the impact modifiers in the layer that is disposed upon the substrate Impact modifiers may be used in amounts greater than or equal to about 0.5, preferably greater than or equal to about 1.0, more preferably greater than or equal to about 1.5 wt % based upon the total weight of the organic coating. In general it is desirable to have the impact modifier present in an amount of less than or equal to about 20, preferably less than or equal to about 15, more preferably less than or equal to about 10 wt % of the total weight of the organic coating.

F. Manufacturing Coated Particles

To make a coated proppant, or particle for gravel pack, the appropriate substrate (for example, single particle, composite particle or hybrid particle), liquid resin, and dry resin powder are mixed at conditions to provide a curable coating composition. In the embodiments employing composite particles or hybrid particles as substrates the organic material used in the curable outer coating may be the same or different as that used in the composite substrate or hybrid substrate, with the proviso that the coating resin material is curable and the resin of the composite substrate or hybrid substrate is at least partially cured.

The substrates, along with the desired thermosetting polymer or thermosetting polymer precursor are first taken in a mixing device and mixed to form a suitable first mixture at a temperature from about 50° F. (10° C.) to about 150° F. (66° C.), preferably about 70° F. (21° C.) to about 120° F. (49° C.). The thermosetting curable resins that constitute the continuous phase of the coating are liquids at room temperature. The substrates are not normally preheated prior to being mixed with the liquid thermosetting polymer. Upon mixing, the liquid thermosetting curable polymer is disposed upon the substrates to form an organic coating. It is desirable to add a coupling agent to the mix at some point before or while the substrate and liquid resin are being mixed. Suitable coupling agents are described in this description.

The mixing can take place in a device that uses shear force, extensional force, compressive force, ultrasonic energy, electromagnetic energy, thermal energy or a combination comprising at least one of the foregoing forces and energies and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, or a combination comprising at least one of the foregoing. Exemplary mixing devices are buss kneaders, helicones, EIRICH mixer, WARING blenders, HENSCHEL mixers, Barber Green batch mixers, ribbon blenders, extruders or the like.

Then the non-reactive powder and/or reactive powder is applied to the first mixture of coated particles and mixed for sufficient time to form a free flowing second mixture of curable resin coated particles having non-reactive powder and/or reactive, preferably novolak or resole, powder embedded in and adhering on the coating. The amount of liquid coating resin and the amount of powder is selected depending upon the desired amount of coating to be applied. Typically the ratio of liquid resin and powder may vary depending upon the temperature and times of addition of the various ingredients. The typical ratio may be adjusted to avoid extremes of processability, namely sticky particles at one extreme and dusty particles at the other extreme. Product performance may depend upon the applied resin level of the combined liquid resin and powder as well as the resin and powder selected.

If desired one or more coatings of liquid resin and powder may be applied. Additional coatings may be applied by coating the particle having the single resin and powder coating with an additional liquid resin coating and then applying an additional portion of powder to the additional liquid coating, and repeating this as desired. Preferably sufficient resin is applied to achieve a loss on ignition (combined coating weight) of from about 0.3 to about 5 weight percent, preferably about 0.3 to about 4 weight percent due to the one or more outer layers of curable resole coating with reactive powder.

Typically a silane is added to the sand in a mixer and, about 10 to 20, e.g., 15 seconds after the silane, a liquid resin is added. The silane could also be premixed into the liquid resin. For example, in one embodiment, 3.0 to 10.4 grams of liquid resole (which is 65% solids) is used per 1000 grams of sand substrate. In another embodiment 3.0 to 5.0 grams of liquid resole (which is 65% solids) is used per 1000 grams of sand substrate. Then about 30 to 60 seconds after the liquid resin is added the reactive powder is added.

Preferably powder is added 60 seconds after the first silane, which is 45 seconds after the liquid resin. However, these addition times are sensitive to mixing speed and ambient temp and mixer design. In a particularly useful example for the coated particles produced at laboratory conditions (23 C with a Hobart mixer), silane is added to the substrate and mixed for 15 seconds; followed by the addition of liquid resin while mixing continues for an additional 45 seconds; followed by the powder addition which continues for an additional 240 seconds (300 seconds total cycle) before the dry, freeflowing particles are finished.

It is desirable to add a lubricant to the mix at some point before the product "breaks down" into free flowing particles. The lubricant is preferably liquid at the mixing temperature and has a sufficiently high boiling point so it is not lost during the mixing process. Suitable lubricants include liquid silicone such as Dow Corning Silicone 200, mineral oil, paraffin wax, petrolatum, cocamidopropyl-hydroysultaine (CHEMBETAINE CAS commercially available from Lubrizol Corporation, or the synthetic lubricant ACRAWAX CT, a bis-stearamide of a diamine, commercially available from Glyco Chemicals, Inc.). The amount of lubricant can vary from about 0.01 or 0.03% to about 0.5% by weight based upon the weight of the particulate material. In another embodiment, the amount of lubricant can vary from about 0.05% to about 0.25% by weight based upon the weight of the particulate material.

Additionally low levels of non-reactive organic or inorganic filler powders such as silica flour, wood flours or talc can be added as processing aids after admixing the reactive powder to the coated substrates or concurrently with admixing the reactive powder to the coated substrates. The non-reactive filler powders, if present, are in an amount of less than about 10% of the amount of the reactive powders. The non-reactive organic or inorganic filler powders typically have average particle sizes of about 2 to about 30 micrometers.

In one embodiment, to obtain improved storage properties, a surface treatment can be applied to the coated particle that consists of a non-reactive powder, optionally a resin or resin/curing agent combination, or both. These components react to form a protective "surface treatment" on the reactive resins. This approach aids in generating a free flowing product and enhances the products ability to be stored at conditions of elevated temperature and humidity without forming excessive clumping that can create issues with the ability to load out the product for transfer to the well site or create issues in removing product from field bins as the product is added to the fracturing fluid to be transported down the well and out into the created fractures. An example of an effective "surface treatment" would be a small amount of a fast reacting resin that can be added along with a proportional amount of a fast reacting curing agent to the surface of the curable coated substrate. In one embodiment, the surface treatment is added in an amount of between about 0.05 and 1.5 wt %, based upon the weight of the substrate. In another embodiment, the surface treatment is added in an amount of between about 0.05 and 1.0 wt %, based upon the weight of the substrate. In another embodiment, the surface treatment is added in an amount of between about 0.05 and 0.5 wt %, based upon the weight of the substrate. The amount of curing agent needed depends upon the resin and may be calculated as is known in the art. In one embodiment, the curing agent is capable of substantially curing the resin in 60 seconds or less. In another embodiment, the curing agent in capable of substantially curing the resin in less then 10% of the total mixing time.

In another embodiment, the surface treatment is about 0.1 wt %, based upon the weight of the substrate of an epoxy resin, such as for example EPON 815 resin, commercially available from Hexion Specialty Chemicals, Inc., which is cured by the addition of 0.012 weight percent of tetrafluoroboric acid, commercially available from Sigma Aldrich Co. as a 48% solution in water. In another embodiment, EPON 815 epoxy resin is added 30-45 seconds after the powdered novolak resin with the aforementioned acid curing agent being added 15-30 seconds after the EPON 815 epoxy resin.

The particles having curable coatings are then recovered.

In one exemplary manner of manufacturing the coated particles, a mixture comprising the substrate, the thermosetting polymer or the thermosetting polymer precursor that will be used for the organic coating, the novolak powder or resole powder and any optional additives are introduced into a mixer such as an EIRICH mixer. In one embodiment, to coat and then form a composite particle, the mixing is first carried out at a first speed for a given time. Following this the mixing speed is changed. The change in the speed of mixing promotes the formation of a layer of the organic coating around the substrate to make particles of the desired size (i.e., about 200 to about 800 micrometers. In another embodiment, to only develop a coating around a substrate particle, changing mixing speeds may not be beneficial. To obtain a desired density for the coated particles, process parameters can be varied. For example, the amount of filler or the amount of organic material can be increased to change the density of the coated particles.

G. Particle Parameters

The following parameters may be useful when characterizing particles of the present invention.

1. Amount of Resin

The amount of resin is determinable by measuring Loss-on-Ignition (LOI). LOI is typically determined in a two hour furnace test, starting by pre-conditioning a series of crucibles with lids in a furnace pre-heated to 1700° F. (927° C.). The crucible with the lid is then placed in the furnace at 1700° F. (927° C.), the furnace is allowed to heat back up to 1700° F. (927° C.), and the crucible with the lid is maintained at 1700° F. (927° C.) for 15 minutes. The pre-conditioned crucibles and lids are then placed in a desiccator containing standard desiccants and allowed to cool to room temperature. Then, the conditioned crucible with the lid is weighed and approximately 8 grams of resin-coated sand are placed in the crucible. Then, the crucible with the lid and the sample is reweighed. The covered crucible and sample are then placed in the furnace at 1700° F. (927° C.), the furnace is allowed to heat back up to 1700° F. (927° C.), and the samples are kept in the furnace for 2 hours after the furnace temperature has returned to 1700° F. (927° C.). The crucible with lid and sample are then transferred to the desiccator and allowed to cool to room temperature. The cooled crucible with lid containing the sample of sand is then re-weighed using the analytical balance, and the loss-on-ignition for each sample is calculated as the difference between the original and final sample weight.

2. Particle Size

The coated particle generally has an average particle size of about 200 to about 2,000 micrometers (about 70 mesh to about 10 mesh). In one embodiment, the coated particle has an average particle size of about 425 to about 850 micrometers (about 40 mesh to about 20 mesh). In another embodiment, the coated particle has an average particle size of about 212 to about 425 micrometers (about 70 mesh to about 40 mesh). The coated particles can have bimodal or higher distributions. Typically the reactive and/or non-reactive powder has an average particle size of about 200 mesh (about 70 mesh) or smaller.

3. Density

It is desirable for the coated particles to have a bulk density of about 0.75 to about 0.95 g/cm³. In one embodiment, the coated particles have a bulk density of about 0.8 to about 0.9 g/cm³. In one embodiment, the coated particles have a bulk density of about 1.7 to about 3.6 g/cm³. The coated particle has an apparent density of about 1 to about 4 grams per cubic centimeter (g/cc) as determined by API RP 58 with isobutanol. In one embodiment, the coated particle has an apparent density of about 1.1 to about 3 g/cc. In another embodiment, the coated particle has an apparent density of about 1.15 to about 2 g/cc. It is desirable for the coated particles to have an apparent density of about 1.6 to about 3.6 g/cm³. Density can be varied by either altering the density of the cores/substrates or by altering the choice of filler or doing both.

4. Unconfined Compressive Strength

Compressive strength of curable proppants is defined as that measured according to the following procedure, known as the Unconfined Compressive Strength or UCS test. In this test, a 2 weight percent KCl solution (doped with a small amount of detergent to enhance wettability) is added to proppant. The KCl solution and proppant (about 6 to 18, typically 12 lbs. proppant per gallon KCl) are gently agitated to wet the proppant. Remove entrained air bubbles, if any. If necessary use a wetting agent to remove the bubbles. This slurry (about 100-200 grams depending on density) is transferred into duplicate 1.25 inch OD×10 inch stainless steel cylinders, equipped with valves on the top and bottom to bleed liquid and gas pressure as required, a pressure gauge reading 0-2000 psi, and a floating piston to transfer pressure to the sample. Typically at least 3, preferably at least 6 specimen molds are loaded to give a length greater than two times the diameter of the finished slug. The bottom valve is opened during the application of stress, allowing fluid to drain from the slurry, and then closed during the application of temperature. The cylinder is connected to a nitrogen cylinder and 1000 psi is imposed on the cylinder, transmitted by the sliding pistons to the sample, and then top valve is shut and bottom valve remains open. (As test temperature is approached near to the fluid valve on the mold, the bottom valve (fluid valve) is closed. Closing the fluid valve too soon may generate enough pressure, as the cell is heating, to prevent/reduce the intended closure stress applied to the proppant slug. Closing the valve too late may allow loss of too much fluid from the slug by evaporation or boiling).

The duplicate cylinders containing the sample are transferred to an oven preheated to the desired setpoint, i.e., 200±1° F., and remain in the oven for 24 hours. Maintain stress and temperature during the cure time. Stress should be maintained ±10%. During the curing process in the oven, loose curable proppant particles become a consolidated mass. At the end of the 24 hours, the cylinders are removed, venting off pressure and fluid rapidly, and the approximately one inch by six inch consolidated slug sample is pressed from the cylinder. The sample is allowed to cool and air dry for about 24 hours, and cut (typically sawed) into compression slugs of diameter:length ratio (D:L) of about 1:2.5 or greater. Air drying is performed at a temperature of less than about 49 degrees C. (120 degrees F.). Typically, both ends of each slug are smoothed to give flat parallel surfaces.

The compression slugs are mounted in a hydraulic press and force is applied between parallel platens at a rate of about 4000 lbs$_f$/minute until the slug breaks. For slugs with compressive strength less than 500 psi, use a loading rate of 1000 lbs$_f$/minute. The force required to break the slug is recorded, replicates are documented, and the compressive strength for each sample is calculated using the formula below. An average of the replicates is used to define the value for this resin coated proppant sample.

$$(Fc, \text{psi}) = 4 \times Fg / \{(p \times d^2)[0.88 + (0.24 d/h)]\}$$

wherein
Fc=compressive strength (psi)
Fg=hydraulic gauge reading (lb force)
p=pi (3.14)
d=diameter of the slug (inches)
h=length of slug (inches)

Compressive strength of the slugs is determined using a hydraulic press, i.e., Carver Hydraulic Press, model #3912, Wabash, Ind. Typical compressive strengths of proppants of the present invention range from 50 to 3000 psi or higher. However, the reproducibility of the UCS test is probably ±10% at best. Typically, the individual resinous layers of the invention have UCS strengths greater than 500 psi, as detailed below. It is also noted that the Compressive Strength Test can be used to indicate if a coating is cured or curable. No bonding, or no consolidation of the coated particles, following wet compression at 1000 psi at 200° F. for a period of as much as 24 hours, indicates a cured material.

5. Roundness

It is desirable for the coated particle to have a roundness of about 0.7 to about 0.9. An exemplary roundness is about 0.8. It is also desirable for the coated particle to have a sphericity of about 0.7 to about 0.9 as measured were measured according to API RP 58 (American Petroleum Industry Recommended Procedure 58).

6. Acidity of Water Extracts

The following description relates to a test procedure that measures the "acidity of water extracts of resin coated proppant". It is not a measure of the acid solubility of a resin coated proppant. It relates to a measure of how much impact the water extractables (from the coating) can have on the pH of water (or the pH of a frac fluid system).

The acidity test (as it relates to resin coated proppants) is a measure of the acidity levels of water extracts of the resin coated proppants. This test relates to the effect that the resin coated proppant (and the water extractable components found in its coating) will have on the pH of the fracturing fluid system that will be used to transport the proppant out into the hydraulically induced fracture.

This is determined as follows. Prepare a large, about 1000 mL, quantity of slowly boiling distilled or deionized water, using the first hot plate and the large beaker. Adjust the heat to give a low or slow steady boiling action. The temperature should be about 212° F. (100° C.) depending on the altitude. Set the heat selector to high on the second hot plate. Weigh 50 g resin coated proppant into a 250 mL graduated beaker. Place the beaker of resin coated proppant on the second hot plate. Rapidly, add boiling deionized (distilled) water to the 125 mL mark on the beaker of resin coated proppant and stir once to remove air bubbles. Allow the mixture to come to a boil, about 15 to 30 seconds is required. Continue to boil for 3 minutes. Place the beaker in an ice bath and stir until the water temperature is 70-80° F. (21-27° C.). Curable and partially cured resin coated proppant will solidify to give a solid mass. It is necessary to break the mass with a spatula while the suspension is cooling. Stir first with the spatula to break up the mass of resin coated proppant, then stir with the thermometer. Stir enough to minimize the time required for full cooling while the water in the ice bath is at least as high as the liquid in the beaker.

After the suspension has cooled back to room temperature, add deionized water back to the beaker, 125 mL mark to replace any water lost during boiling; and immediately measure the pH of the water layer using a standardized pH meter. Record the initial pH to 0.05 units. While measuring pH the pH electrode is not in the proppant layer. Using 0.1 N sodium hydroxide titrate the pH of the suspension to pH=9.00. Record the volume of the titrant, required to reach the pH endpoint, to the nearest 0.05 mL. Record the endpoint pH to the nearest 0.05 units.

7. Acetone Extraction Test

The Acetone Extraction Test is another method to determine if a coating or coatings are curable. The acetone extraction method dissolves the fraction of resin that is uncured. This test is performed by placing a dried pre-weighed sample, about 50 grams, of resin coated particles (with a known resin coating content) in a Soxhlet thimble and refluxing acetone condensate over the material for 2 hours. After drying the treated sample, the change in resin content is reported as percent acetone extractables. Specifically, because uncured resin is soluble in acetone, and cured resin is not soluble in acetone, the acetone condensate reflux will remove only the uncured fraction. By weighing the sample both before and after acetone reflux and determining a percentage change, the degree of cure is calculated. For example, the weight loss for a typical cured resin coated sand may only be 5% of the LOI of the sample. Thus, a sample having a 2.0 grams LOI may have a 0.1 gram acetone extractable. In contrast, the weight loss for a fully curable resin coated sand will be the LOI of the sample. Thus, for a sample having a 2.0 grams LOI, removing 2.0 grams by acetone extraction would reflect that the sample is 100% curable.

8. Temperature Stick Point Test

The Temperature Stick Point Test is another indicator of whether a coating is curable. It is performed by placing coated material on a heated melt point bar and determining the lowest temperature at which the coated material sticks. A "sticking temperature" of greater than 350° F. at the hottest end of the bar, typically indicates a cured material, depending upon the resin system used. The melt point bar is a brass metal bar (18 inches long and 2 inches wide) with an electric heating element at one end. Therefore, a temperature gradient can be established across the length of the bar and the temperature across the bar is monitored with thermometers or thermocouples.

Using a funnel, a uniform strip of about 100 grams of resin coated substrate, e.g., sand, is laid on the heated bar and cured for 60 seconds. Then the bar is tipped to allow any uncured proppant to fall off. Melt point is the lowest temperature at which the resin coated sand forms a continuous mass and does not fall from the bar once it is tipped to ninety degrees. Typically, the cured coating has a sticking temperature in the range from about 150 to about 300° F., for example about 200 to about 250° F.

9. Wettability of Particles in Water

Wettability to determine the quantity of selected surfactant(s) required to wet proppant(s) is performed to determine the quantity of surfactant(s) required for the reduction of aeration/air entrainment to zero.

Prepare diluted surfactant solution and fill a 25 mL glass burette. A dilution factor of 1:100 is typical. However, many surfactants may be tested as is. Then, add 200 mL of 2% KCl to a 300 mL Berzelius (tall form) beaker (deionized $H_2O$ may be used). Adjust the beaker under a VARIAC or stirrer with built-in speed control so the blade is about ¼" above the bottom. The beaker should be clamped in place using a ring stand and clamp. Then adjust the burette to an appropriate position, set the stirrer switch to OFF and adjust the speed control to its highest position, which will not eject the contents of the beaker (sand in the water). Then, start the stirrer and add the appropriate amount of proppant to be tested.

Typical proppant loading ranges are listed in TABLE A:

TABLE A

| Proppant Loading Ranges | |
|---|---|
| $lb_m$/gal | q/200 mL |
| 2 | 48 |
| 4 | 96 |
| 6 | 144 |
| 8 | 192 |
| 10 | 240 |
| 12 | 288 preferred |

Stir for 5 seconds, and then stop and observe the air bubbles adhering to the proppant grain surfaces. If no bubbles are visible, the proppant is considered fully wetted. If there are air bubbles then add ¼ mL of surfactant, restart the stirrer for 10 seconds, and then again observe the air bubbles adhering to the proppant surface. If bubbles are again observed, then repeat the step of adding surfactant stirring and observing until most of the bubbles have disappeared, then reduce the incremental surfactant to ⅛ mL. When the bubbles are no longer observed, record the volume of surfactant required for wetting the proppant.

Repeat the test as follows to more nearly duplicate the usage conditions and procedure in the field.

Prepare another sample of water, and add to the water the exact amount of diluted surfactant (determined by the first procedure for when the proppant was fully wetted). Then place the beaker under the stirrer and start the stirrer. Add the proper amount of proppant. Stir for 10 seconds, and then stop the stirrer. Observe and record the relative quantity of air bubbles on the surfaces of the proppant. If there are any bubbles continue titration as before until they are gone and no additional surfactant is required. Record the additional volume of surfactant required.

Calculate the volume of surfactant required to completely wet the proppant.

$Vv$,(name of surfactant),gal/1000gal=1000×(($V_{surf}$× $F_D$)/$V_{fluid}$) at $X$lb$_m$ prop/gal.

$V_M$,(name of surfactant),gal/1000gal=119.831× (($V_{surf}$×$F_D$)/$M_{prop}$) for each lb$_m$ prop/gal.

where,

Vv is volume of surfactant to wet proppant, gal/1000 gal at X lb$_m$ prop/gal.

$V_M$ is volume of surfactant to wet proppant, gal/1000 gal/lb, prop/gal $F_D$ is dilution factor, volume surfactant/volume diluent, dimensionless $V_{surf}$=experimental volume of diluted surfactant, mL $M_{prop}$=mass of proppant tested, g $V_{fluid}$=volume of water in the proppant/water mixture, mL 10. Turbidity Test The particles are subjected to a Turbidity Test as follows. Weigh 15.0 grams of deionized/distilled water, doped with 0.1% FSO surfactant, 15 grams into a clean sample cell (Hach catalog #21228 or equivalent) and replace the screw cap of the cell. FSO is duPont Fluorosurfactant ZONYL™ FSO. Wipe the outside of the cell with lint free paper. Make sure no air bubbles adhere to the walls of the cell. 4) Place the cell into the turbidimeter (HACH Model 2100P) and read the turbidity in NTU units. Weigh 5.00 grams of the sample to be measured and place this in the cell. Using the Vortex mixer (Thermolyne Maxi-Mix 1 or equivalent), agitate the sample/water mixture for 10 seconds. Again, clean the outside of the cell with lint free paper. Place the sample/cell back into the turbidimeter and read the turbidity, 30 seconds after the Vortex mixing ended. Record the turbidity in NTU units for this sample as "dust content".

Preferably the particles of the present invention achieve a turbidity measurement of less than 100 NTU after being subjected to 30 minutes ball mill time, less than 200 NTU after being subjected to 60 minutes ball mill time, and/or less than 300 NTU after being subjected to 150 at 60 minutes ball mill time. The coated particles generally have a turbidity of less than or equal to about 250 as measured according to API RP 56.

11. Caking (Storage Stability) Test

The coated particles are subjected to an elevated temperature/humidity exposure (under controlled conditions) in order to determine the amount of clumping (bonding together of coated particles) that will occur in a storage situation. A 50 gram sample of product is placed in a cardboard cup having a 2 inch ID and ±3 inch depth. On top of the sample is placed a 1 kilogram weight having an OD of ±1.875 inch (so that the weight fits snugly inside the sample cup). To prepare a desiccator for the caking test a saturated solution of sodium chloride is prepared. A portion of the salt solution (±200 ml) is placed in an open container that is situated inside the desiccator. Positioned over (but not touching) the salt solution is the sample platform. The presence of the saturated salt solution in the desiccator will insure the caking test is performed at a ±75% humidity level. The sample cup containing the coated product and kilogram weight are placed on the sample platform and the desiccator is sealed. The sealed desiccator (containing the salt solution and sample cup) is then placed in a constant temperature oven set to maintain a test temperature (usually ±130° F.). The desiccator remains sealed at the test temperature for a minimum of 12 hours. At the prescribed time the desiccator is removed from the oven and the sample cup removed from the desiccator. The one kilogram weight is taken off the sample and the cup held at approximately a 45° angle with vertical while continually rotating the cup for a minimum of 15 seconds. A visual inspection is made of the sample and a caking value is given according to the following table:

| Caking Value | Appearance Description |
| --- | --- |
| 0 | product is free flowing |
| 0.5 | product breaks away from the wall of the sample cup and only small clumps remain |
| 1 | product does not break away from walls of sample cup but can be penetrated easily with a tongue depressor |
| 2 | Product does not break away from the walls of the sample cup and pressure must exerted to penetrate the sample's surface |
| 4 | Product does not break away from cup walls and significant pressure must be exerted to penetrate the surface of the sample |

H. Use of Particles as Proppant

The particles, as described in this invention comprise curable coatings. Thus, they can be injected into a subterranean formation and the coatings cure in the subterranean formation. They may be injected into the subterranean formation as the sole proppant in a 100% proppant pack (in the hydraulic fracture) or as a part replacement of existing commercial available ceramic and/or sand-based proppants, resin-coated and/or uncoated, or as blends between those, e.g., coated particles are 10 to 50 weight % of the proppant injected into the well. For example, after first pumping a precured proppant or uncoated proppant is placed in a well, a curable proppant (of the present invention) can be placed in the fracture that is closest to the wellbore or fracture openings. This type fracturing treatment in done without stopping to change the proppant and is know in the industry as a "tail-in treatment".

In the case of curable proppants, the method may comprise curing the curable resin composition by exposing the resin composition to sufficient heat and pressure in the subterranean formation to cause curing of the resins and consolidation of the curable proppant of the present invention. In some cases an activator can be used to facilitate consolidation of curable proppant. In another embodiment employing a curable resin composition on the proppant, the method further comprises low temperature acid catalyzed curing at temperatures as low as 70 degrees F. An example of low temperature acid catalyzed curing is disclosed by U.S. Pat. No. 4,785,884 incorporated herein by reference in its entirety.

The curable coated particles of the invention are especially advantageous whether the coated particles are used alone as a proppant, or together with other proppants as a tail end after using uncoated proppant or precured coated proppant or another curable proppant to be in the portion of the fracture nearest the wellbore.

I. Use of Coated Particles as Gravel Packing or for Sand Control

It is known that oil or gas well boreholes are provided with gravel packing about their bore holes. Another aspect of the present invention is that these gravel packs may be provided with the coated particles of the present invention.

These coated particles would be provided in the standard sizes known for gravel used in gravel packs. Typically the strength requirements for a proppant particle used in packed fractures are higher than for gravel packing. The gravel pack may serve for sand control to prevent flow of formations fines from the formation into the well bore.

In gravel packing operations, the coated particles can be suspended in a carrier fluid and pumped into a well bore in which the gravel pack is to be placed. The carrier fluid leaks off into the subterranean zone and/or is returned to the surface while the coated particles are left in the subterranean zone. The resultant gravel pack acts as a filter to separate formation sands from produced fluids while permitting the produced oil and/or gas to flow into the well bore. A method of forming a gravel pack therefore comprises suspending the coated particles in a carrier fluid to form a suspension; pumping the suspension into a well bore; and draining the carrier fluid to form a gravel pack. Once in place the injected particles cure to form a permeable solid barrier is formed which restrains the movement of the sand.

For another example, the coated particles may be used by filling a cylindrical structure with the resin-containing particulate material, i.e., proppant, and inserted into the wellbore. Once in place, the coated particles act as a filter or screen to eliminate the backwards flow of sand, other proppants, or subterranean formation particles. This is a significant advantage to eliminate the back flow of particulates into above ground equipment. This employs prepacked screens, in which the resin coated sand/ceramic is put through a cure before the screen assembly is placed in the well.

The following examples, which are meant to be exemplary, not limiting, illustrate compositions and methods of manufacturing of some of the various embodiments of the coated particles described herein.

EXAMPLES

The following examples serve to illustrate the present invention. Unless otherwise indicated all parts and percentages are by weight, and all screen mesh sizes are U.S. Standard Screen sizes. In the Examples the silane is A1100 adhesion promoter from Union Carbide Corporation. The proppant was coated with liquid OWR-262E, a commercial phenol-formaldehyde resole resin manufactured by Hexion Specialty Chemicals, Inc., Louisville, Ky. The powder used with the proppant (unless otherwise noted) was DURITE SD-909A (a phenol-formaldehyde novolak powder (with 15% hexamethylenetetramine), a commercial phenol-formaldehyde novolak manufactured by Hexion Specialty Chemicals, Inc., Louisville, Ky. The DURITE SD-909A powder has a particle size range for passing through a 200 mesh screen.

Example 1

This experiment was conducted to determine the properties of a coated particle of the present invention. The coating cycle was as follows. 1000 grams of CARBOPROP® 12/18 intermediate density ceramic particles at room temperature were added to a Hobart lab mixer. Then the mixer agitator was started. Then, 0.8 grams of A1100 (aminopropyltriethoxysilane) was added and the timer is started, (0:00 minutes). After 30 seconds, 10.0 gms of OWR-262E (phenol-formaldehyde liquid resole) was added. When the timer is at 2 minutes, 18.4 grams of DURITE SD-909A phenol-formaldehyde novolak powder (with 15% hexamethylenetetramine) was added with continued mixing (about 2.4% total organics on the particles). When the timer is at 12 minutes, the mass was free flowing and was removed from the mixer. This product was then tested for 24 hour UCS bond strength at conditions of 1000 psi and 200° F., yielding 590 psi.

Example 2

This experiment was conducted to determine the properties of a coated particle of the present invention. The coating cycle was as follows. 1000 grams of CARBOPROP 12/18 intermediate density ceramic particles at room temperature were added to a Hobart lab mixer. Then the mixer agitator was started. Then 0.8 grams of A1100 (aminopropyltriethoxysilane) was added and the timer is started, (0 minutes). After about 30 seconds, 10.0 gms of OWR-262E (phenol-formaldehyde liquid resole) was added. When the timer is at 2 minutes, 33.2 grams of SD-672D powder (phenol-formaldehyde novolak, no hexamethylenetetramine) was added with continued mixing (about 4% total organics on the particles); SD-672D powder had a particle size of particle size of +/−100 mesh. When the timer was at 12 minutes, the mass was free flowing and was removed from the mixer. This product was then tested for 24 hour UCS bond strength at conditions of 1000 psi and 200° F., yielding 1075 psi.

Example 3

A curable resin coating was developed by adding 0.4 grams of coupling agent (A-1100 silane) to 1 kilogram of substrate with constant agitation. A liquid resole (OWR-262E), available from Hexion Specialty Chemicals, Inc., Louisville, Ky.), was added at 15 seconds into the cycle, after the silane. A powdered novolak resin DURITE FD-900-A, (with 7% hexamethylenetetramine was used to prepare Samples C, D and G), or a powdered novolak resin, SD-909A, (with 15% hexamethylenetetramine was used to prepare Samples A, B, E, and F) each available from Hexion Specialty Chemicals, Inc., Louisville, Ky. was then added at 1 minute into the cycle time. The material was mixed for 4 additional minutes and discharged from the mixing apparatus. Using the procedure above, analytical properties varied while evaluating alternative resins, resin levels, particle sizes and substrates. Concentration of hexamethylenetetramine in the novolak powder thus varied from 7-15%, dependant upon which powder was used in each formulation (see Tables 1, 2, and 3 for analytical data).

Figure 5:
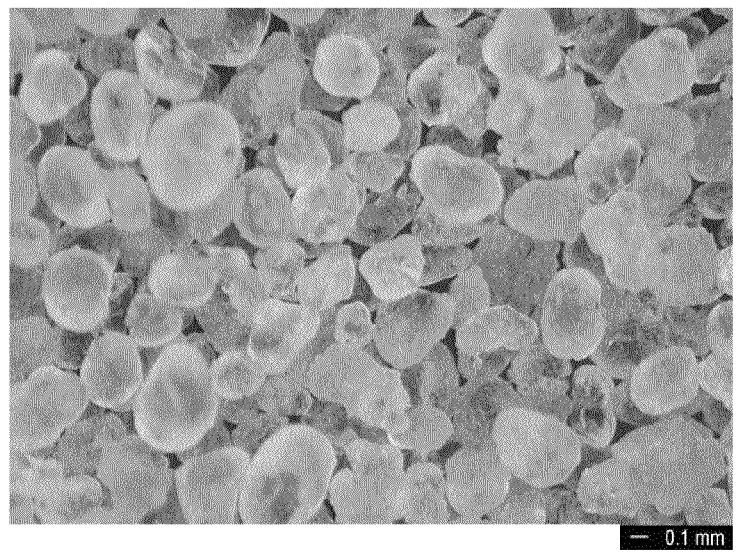
FIG. 5 shows a photograph of particles of Sample A "as is" produced in a laboratory at a magnification of about 10×.

FIG. 5 shows a photograph of a sample of lab prepared particles (as is) of Sample A with about a 10× magnification.

Figure 6:
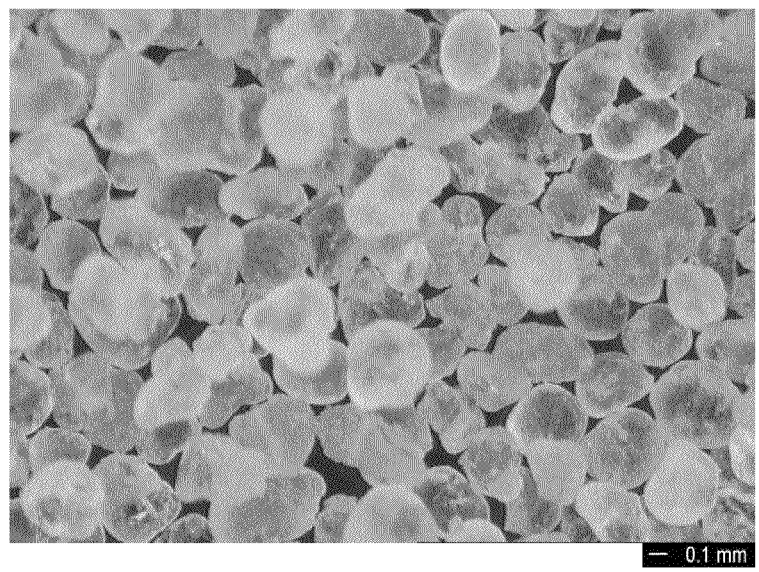
FIG. 6 shows a photograph of particles of Sample B "as is" produced in a laboratory at a magnification of about 10×.

FIG. 6 shows a photograph of a sample of lab prepared particles (as is) of Sample B with about a 10× magnification.

Figure 7:
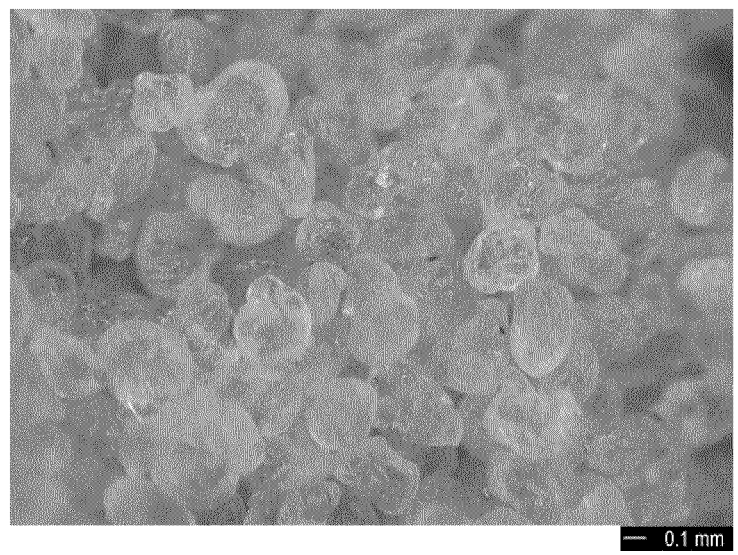
FIG. 7 shows a photograph of a slug of Sample B particles formed after a 1K psi UCS test at 200 degrees F. at a magnification of about 10×.

FIG. 7 shows a photograph of a slug of lab prepared particles of Sample B with about a 10× magnification after the 1000 psi unconfined compressive strength test.

Figure 8:
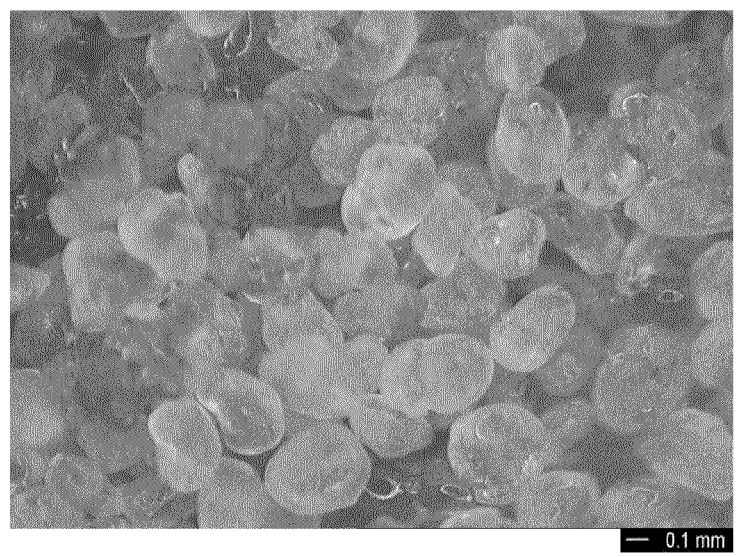
FIG. 8 shows a photograph of Sample B particles after a hot tensile test at a magnification of about 10×.

FIG. 8 shows a sample of lab prepared particles of Sample B with about a 10× magnification after a hot tensile strength test.

A caking analysis was performed on certain material by placing 50 grams of coated material in a cylindrical container with a 1 kilogram load on it and placed in a heated oven for 24 hours at temperatures ranging from 105-140° F. (see TABLES 1, 2 and 3 for analysis data).

TABLE 1

| Property Measured | Sample Number | | | |
|---|---|---|---|---|
| | A | B | C | D |
| Sand, API Mesh Size, Nominal | 40/70 | 40/70 | 40/70 | 40/70 |
| Silane Addition A-1100, wt. = grams/time = seconds | 0.4/0 | 0.4/0 | 0.4/0 | 0.4/0 |
| Resole Addition OWR-262E, wt. = grams/time = seconds | 10.4/15 | 7.0/15 | 8.6/15 | 5.2/15 |
| Powder Addition SD-909A, wt. = grams/time = seconds | 23.0/60 | 20.0/60 | | |

TABLE 1-continued

| Property Measured | Sample Number | | | |
|---|---|---|---|---|
| | A | B | C | D |
| Powder Addition FD-900A, wt. = grams/time = seconds | | | 21.5/60 | 11.5/60 |
| Discharge, time = seconds | 300 | 300 | 300 | 300 |
| Resin Content, LOI, weight % | 2.98 | 2.14 | 2.46 | 1.19 |
| Melt (Stick) Point, °F.[°C.] | 204 [96] | 214 [101] | <185 [85] | <185 [85] |
| Hot Tensile Strength, psi | 119 | 44 | | |
| Particle Size Distribution US Standard Sieve No. [mm] | | | | |
| 30 [0.589] | 0.1 | 0.1 | 0.0 | 0.0 |
| 40 [0.42] | 6.0 | 7.7 | 6.0 | 7.5 |
| 45 [0.351] | 10.2 | 10.5 | 22.2 | 24.2 |
| 50 [0.297] | 38.0 | 34.9 | 48.8 | 48.7 |
| 60 [0.249] | 25.5 | 24.5 | 14.6 | 13.9 |
| 70 [0.211] | 17.9 | 19.6 | 7.6 | 5.6 |
| 80 [0.150] | 2.3 | 2.6 | 0.8 | 0.1 |
| pan [<0.150] | 0.0 | 0.1 | 0.0 | 0.0 |
| Total | 100.0 | 100.0 | 100.0 | 100.0 |
| in-size (−40 + 70) [−0.42 + 0.211] | 91.6 | 89.5 | 93.2 | 92.4 |

TABLE 2

| | Sample Number | | | |
|---|---|---|---|---|
| | A | B | C | D |
| Turbidity, NTU (FTU) | 233 | 125 | | |
| Unconfined Compressive Strength | | | | |
| Closure Stress at 200° F. (93° C.), 24 hr in 2% KCl, 12 lb_m/gal added at 0.0 psi [0.0 MPa] | 405 [2795] | 210 [1449] | 305 [2105] | 85 [587] |
| Closure Stress at 200° F. (93° C.), 24 hr in 2% KCl, 12 lb_m/gal added at 1,000 psi [6.9 MPa] | 1325 [9143] | 508 [3505] | 955 [6590] | 231 [1594] |
| Closure Stress at 150° F. [66° C.], 24 hr in 2% KCl, 12 lb_m/gal added at 0.0 psi [0.0 MPa]] | 103 | 41 | | |
| Closure Stress at 150° F. [66° C.], 24 hr in 2% KCl, 12 lb_m/gal added at 1,000 psi [6.9 MPa] | 146 | 81 | | |
| Caking Tendency @ 105° F. | | | free flowing | Free flowing |
| @ 125° F. | | | free flowing | Free flowing |
| @ 140° F. | | | free flowing | Free flowing |
| Clusters, weight % | 1.0 | 1.0 | 1.0 | 1.0 |
| Coating Efficiency, weight % | 100.0 | 100.0 | 100.0 | 100.0 |
| pH of Water Extract   initial pH | 8.9 | 8.8 | | |
| mL 0.1N NaOH to pH = 9 | 0.4 | 0.3 | | |
| mL 0.1N NaOH to pH = 10 | 4.6 | 4.4 | | |

TABLE 3

| | Sample | | |
|---|---|---|---|
| | E | F | G |
| 12/18 CarboProp | 500 g | 1,000 g | 1,000 g |
| A-1100 | 0.4 g | 0.4 g | 0.4 g |
| OWR-262E | 5.0 g | 10.6 g | 10.6 g |
| SD-909A | 8.2 g | 32.4 g | — |
| FD-900A | — | — | 32.4 g |
| Melt (stick) point °F. | <185 | <185 | <185 |
| wt % LOI | 2.14 | 3.80 | 3.75 |
| UCS, psi (1K) @ 200° F. | 490 | 2,000 | 1,750 |
| UCS, psi (atm) @ 200° F. | | 1,020 | 880 |
| Hot Tensile, psi | 224 | 232 | 121 |
| Initial pH | | 8.43 | 8.72 |
| milliliters to pH = 9 | | 0.9 | 0.7 |
| milliliters to pH = 10 | | 7.6 | 5.6 |
| pH (slurry water) | | 7.79 | 8.13 |

Cycle Addition Times
Time = 0: Add Coupling Agent
Time = 30 seconds: Add Resole
Time = 2 minutes: Add PF powder
Time = 12 minutes: Discharge
SST (Starting Sand Temperature) = Ambient Temperature The above data demonstrated that by coating sand or ceramic substrates with a liquid phenol-formaldehyde resole at room temperature, followed by the introduction of a powdered phenol-formaldehyde novolak resin (with or without hexamethylenetetramine curative) yields a high performance, free-flowing resin coated particle that can be used as an oilfield proppant.

Example 4

This example shows delaying the addition of the powder (after the silane and resole) dries out the resole and causes the resole to lose its ability to hold powder. The addition of the novolak powder at delayed times shows the effect of free (non-adhering) powder to the substrate due to partial drying of the liquid resole as the cycle time progresses. After coating four separate batches with various addition times, each material was sieved through 100 and 200 mesh screens. The unadhered powder collected on the pan was weighed. TABLE 4 lists the powder addition times and shows the unadhered residual phenol formaldehyde resin powder resulting from each sample preparation. The other times in the Cycle Addition Time were as in TABLE 4.

7.0 grams of a liquid resole (OWR-262E), available from Hexion Specialty Chemicals, Inc., Louisville, Ky.), was added at 15 seconds into the cycle, after the silane. However, the time of addition of 20.0 grams of the powdered novolak resin (FD-900-A), available from Hexion Specialty Chemicals, Inc., Louisville, Ky.) was varied. In the first run, the powder was added at 1 minute into the cycle time. In subsequent runs, the powder was added at a later time as shown in TABLE 4. The results below show an increasing amount of unadhered when powder addition was delayed.

TABLE 4

| Powder addition time | Unadhered residual PF powder |
|---|---|
| 1 min | 1.04 g |
| 2 min | 2.01 g |
| 3 min | 2.96 g |
| 4 min | 2.98 g |

Ingredients:
1,000 grams raw sand
7.0 grams of OWR-262E liquid resole
20.0 grams of FD-900-A powdered novolak resin Example 5

An additional coating test was performed to determine the effects of reversing the process, namely, by adding the powder to the sand substrate before the liquid resole. The phenol formaldehyde powder was added at 15 seconds followed by the liquid resole addition at 60 seconds with the same cycle time of 300 seconds. The material separated into three phases: the aggregates of resole plus sand; the unadhered powder; and the poorly, partially coated substrate.

Figure 9:
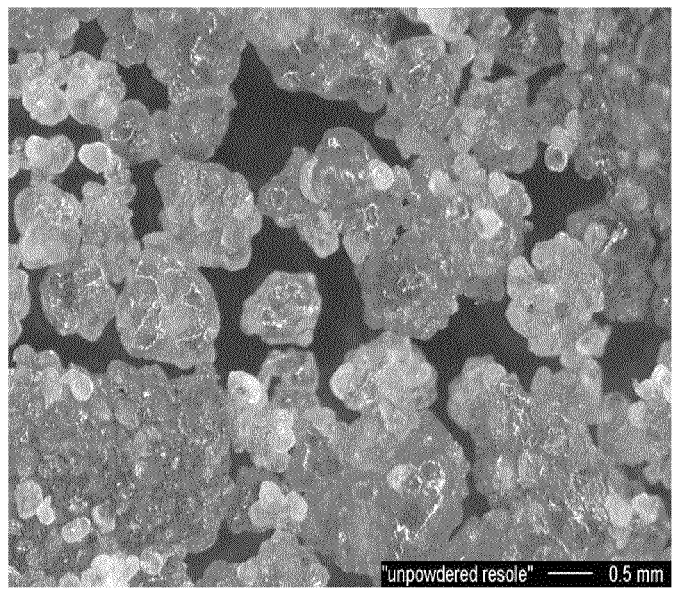
FIG. 9 shows a sample of unpowdered resole from a comparative example at a magnification of about 12×.

FIG. 9 (with 12× magnification) shows aggregates (clusters) of resole and sand resulting from sifting a sample of the poorly partially coated substrate. FIG. 9 shows a number of aggregates containing a high amount of resin. This sample was tested for loss on ignition (LOI) and found to have an LOI of 19.1 wt. %. This indicated the liquid resin was not effective to coat the particles in a homogeneous layer. Rather than coat the substrate particles, the resole resin concentrated as aggregates with a few grains and powdered resin.

Figure 10:
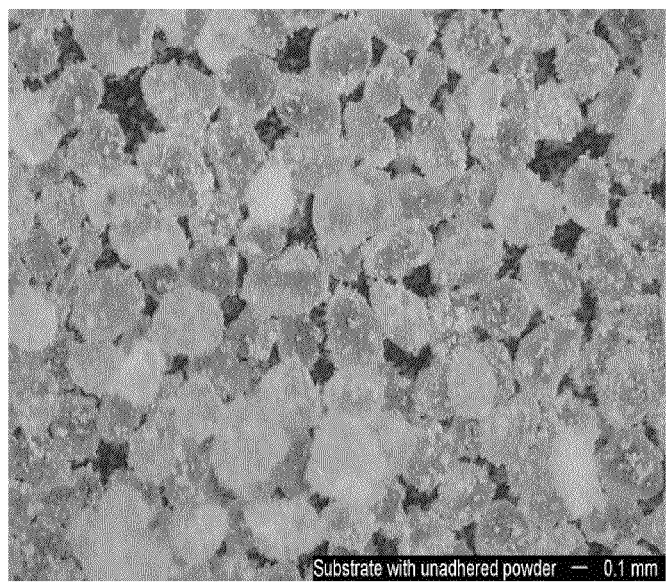
FIG. 10 shows a sample of the product produced by a process which reversed the order of coating and powder sample from a comparative example a magnification of about 30×.

FIG. 10 (with 30× magnification) shows another sample of the poorly partially coated substrate that was recovered "as is" and not sifted. FIG. 10 shows a large amount of powder not adhered to the substrate. This sample was tested for LOI and found to have an LOI of 1.99 wt. %. The presence of large amounts of unadhered powder indicates the inability to reach a homogeneous dry mix of powder and substrate in advance of the liquid resin addition. Once the liquid resin is added, it will only ball-up as the aggregates of FIG. 9, creating a situation where the substrate surface is not adhesive to the powder remaining.

Example 6

This example illustrates the effect of a resin "surface treatment" applied to the curable coated proppant. A curable resin coating is applied to a sand substrate by first applying 0.75 grams of a coupling agent (A-1100) to a 1000 gram sample of sand while applying constant agitation. A liquid resole (OWR-262E) at the concentration of 3 grams is then added to the sand/coupling agent mixture (starting 15 seconds after the addition of the coupling agent. At the one minute mark (45 seconds after the addition of the coupling agent), 16 grams of the powdered novolak SD-536C (containing 10% hexamethylenetetramine) is added to the mixture. Both of the aforementioned resins are available from Hexion Specialty Chemicals, Inc., Louisville, Ky. Thirty seconds after the addition of the powdered resin, a silicone lubricant (XIAMETER PMX-200) is added to the mixture. Thirty seconds after the addition of the silicone, the first component of the "surface treatment" EPON 815 (available from Hexion Specialty Chemicals, Inc., Houston, Tex.) at a concentration of 1 gram is applied to the coated sand. Thirty seconds after the addition first component of the surface treatment (150 seconds after the addition of the first component), 0.12 grams of tetrafluoroboric acid is added, as a curing agent, to crosslink and complete the surface treatment. Forty seconds after the addition of the acid, 1 gram of a solid surfactant is added. At the 200 second mark (ten seconds after the addition of the dry surfactant), the coated sand exists the mixer. This coated product is designated as Sample A. Sample B is prepared with the same ingredients and timing sequence but without the addition of the surface treatment components (EPON 815 and tetrafluoroboric acid). Although the surface treatment additives were not included, the total mixing time was the same. To demonstrate the effect of the surface treatment (as related to the storage properties of the coated product), a caking test was performed at 150° F. and ±75% humidity. Sample A (coated sand with surface treatment) was determined to have a "caking value" of 1 (denoting a sample with soft clumps). Sample B (subjected to the same test conditions) gave a caking value of 4 (denoting clumps that resisted breaking up when pressure is applied).

Example 7

This example illustrates the effect of using a high melt point reactive powder resin to improve storage stability (reduce "caking tendencies" in hot/humid conditions). A curable resin coating is applied to a sand substrate by first applying 0.75 grams of a coupling agent (A-1100) to a 1000 gram sample of sand while applying constant agitation. A liquid resole (OWR-262E) at the concentration of 3 grams is then added to the sand/coupling agent mixture (starting 15 seconds after the addition of the coupling agent). At the one minute mark (45 seconds after the addition of the coupling agent), 16 grams of the powdered novolak PD-6564 (containing 5% hexamethylenetetramine) is added to the mixture. The PD-6564 powder has a softening onset point (as measured by a thermal mechanical analyzer) of 222° F. Both of the aforementioned resins are available from Hexion Specialty Chemicals, Inc., Louisville, Ky. Thirty seconds after the addition of the powdered resin, a silicone lubricant (XIAMETER PMX-200) is added to the mixture. One hundred seconds after the addition of the silicone lubricant, 1 gram of a solid surfactant is added. At the 200 second mark (ten seconds after the addition of the dry surfactant), the coated sand exists in the mixer. This coated product is designated as Sample C. Sample B (with no surface treatment) is prepared with the ingredients described in Example 6 and the same timing sequence. To demonstrate the effect of the high melt point powder (as related to the storage properties of the coated product), a caking test was performed at 150° F. and ±75% humidity. Sample C (coated sand with high melt point resin) was determined to have a "caking value" of 0 (denoting a free flowing sample). Sample B (subjected to the same test conditions) gave a caking value of 4 (denoting clumps that resisted breaking up when pressure is applied).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. Free flowing coated particles having a particle size range of about 6 mesh to about 200 mesh,
    each particle comprising:
        a substrate selected from the group consisting of:
            a particulate substrate comprising an inorganic material and optionally an at least partially cured coating,
            a particulate substrate comprising an organic material and optionally an at least partially cured coating,
            a composite particle comprising a substantially homogeneous formed particle comprising a first portion of a binder and filler particles dispersed throughout said first portion of binder, wherein said first portion is at least partly cured, wherein the particle size of the filler particles ranges from about 0.5 to about 60 µm; and
            a hybrid particle comprising a composite layer disposed on an inorganic particulate core, the composite layer comprising an at least partially cured organic coating and filler particles, wherein the particle size of the filler particles ranges from about 0.5 to about 60 µm; and
        a coating disposed upon the substrate, the coating comprising a continuous phase comprising a curable liquid resin and a reactive powder embedded or adhered to the continuous phase, wherein the curable liquid resin comprises at least one member selected from the group consisting of resole phenolic-formaldehyde resins, polyester resins, acrylic polymer resins, urethane resins, epoxy resins, melamine resins and anhydride resins, and wherein the reactive powder comprises at least one member selected from the group consisting of resole phenolic-formaldehyde resins, novolak phenolic-formaldehyde resins, polyester resins, acrylic polymer resins, urethane resins and epoxy resins, wherein the reactive powder is reactive with the curable liquid.

2. The coated particles of claim 1, wherein the reactive powder has a softening onset point as measured by a TMA (thermal mechanical analyzer) of ≥150° F.

3. The coated particles of claim 1, wherein the reactive powder has a softening onset point as measured by a TMA (thermal mechanical analyzer) of ≥200° F.

4. The coated particles of claim 1, wherein the reactive powder further comprises a curing agent.

5. The coated particles of claim 4, wherein the curing agent comprises hexamethylenetetramine.

6. A method for preparing the free flowing coated particles of claim 1 comprising mixing the substrate with the curable liquid resin at a temperature of between about 50° F. to about 150° F. to form the coating comprising the continuous phase, then admixing the reactive powder such that it is embedded in or adhered to the continuous phase.

7. The method of claim 6 wherein the reactive powder has a softening onset point as measured by a TMA (thermal mechanical analyzer) of ≥150° F.

8. The method of claim 6 wherein the reactive powder has a softening onset point as measured by a TMA (thermal mechanical analyzer) of ≥200° F.

9. The method of claim 6 further comprising applying a surface treatment to the free flowing coated particles, wherein the surface treatment is selected from the group that consists of a non-reactive powder, a resin or resin/curing agent combination, or both, disposed on the coating.

10. A method of treating a subterranean formation comprising injecting into the subterranean formation a fracturing fluid comprising the free flowing coated particles of claim 1.

11. A proppant comprising the coated particle of claim 1.

12. The proppant of claim 11 wherein the coated particle further comprises a surface treatment.

13. A method of forming a gravel pack comprising suspending the free flowing coated particles of claim 1 in a carrier fluid to form a suspension, pumping the suspension into a well bore, and draining the carrier fluid to form the gravel pack.

14. A gravel pack particle comprising the coated particle of claim 1.

15. The gravel pack of claim 14 wherein the coated particle further comprises a surface treatment.

16. A foundry coated particle comprising the free flowing coated particle of claim 1.

17. The foundry coated particle of claim 16 wherein the coated particle further comprises a surface treatment.

18. Free flowing coated particles having a particle size range of about 6 mesh to about 200 mesh,
    each particle comprising:
        a substrate selected from the group consisting of:
            a particulate substrate comprising an inorganic material and optionally an at least partially cured coating,
            a particulate substrate comprising an organic material and optionally an at least partially cured coating,
            a composite particle comprising a substantially homogeneous formed particle comprising a first portion of a binder and filler particles dispersed throughout said first portion of binder, wherein said first portion is at least partly cured, wherein the particle size of the filler particles ranges from about 0.5 to about 60 µm; and
            a hybrid particle comprising a composite layer disposed on an inorganic particulate core, the composite layer comprising an at least partially cured organic coating and filler particles, wherein the particle size of the filler particles ranges from about 0.5 to about 60 µm; and
        a coating disposed upon the substrate, the coating comprising a continuous phase comprising a curable liquid resin and a reactive powder embedded or adhered to the continuous phase, and
        a surface treatment disposed on the coating, wherein the surface treatment is selected from the group that consists of a non-reactive powder, a resin or resin/curing agent combination, or both, disposed on the coating, wherein the curable liquid resin comprises at least one member selected from the group consisting of resole phenolic-formaldehyde resins, polyester resins, acrylic polymer resins, urethane resins, epoxy resins, melamine resins and anhydride resins, wherein the reactive powder comprises at least one member selected from the group consisting of resole phenolic-formaldehyde resins, novolak phenolic-formaldehyde resins, polyester resins, acrylic polymer resins, urethane resins and epoxy resins, and wherein the reactive powder is reactive with the curable liquid.

19. The coated particles of claim 18 wherein the surface treatment comprises a reactive liquid selected from the group consisting of resole phenolic-formaldehyde resins, polyester and unsaturated polyester resins, acrylic polymer resins, urethane resins, epoxy resins, melamine resins, anhydride resins and combination thereof, and a curing agent.

20. The coated particles of claim 19 wherein the surface treatment comprises a liquid epoxy resin, and wherein the curing agent is capable of curing the resin in less than 60 seconds.

21. The coated particles of claim 20 wherein the curing agent comprises tetrafluoroboric acid.

22. The coated particles of claim 18, wherein the curable liquid resin comprises a resole phenolic-formaldehyde resin, and the reactive powder comprise at least one member of the group consisting of resole phenolic-formaldehyde resin, novolak phenolic-formaldehyde resin, polyester, acrylic and urethane.

23. The coated particles of claim 18, wherein the reactive powder has a softening onset point as measured by a TMA (thermal mechanical analyzer) of ≥150° F.

24. The coated particles of claim 18, wherein the reactive powder has a softening onset point as measured by a TMA (thermal mechanical analyzer) of ≥200° F.

25. The coated particles of claim 18, wherein the surface treatment is added in an amount of between about 0.05 and 1.5 wt %, based upon the weight of the substrate.

26. A method for preparing the free flowing coated particles of claim 18 comprising mixing the substrate with the curable liquid resin at a temperature of between about 50° F. to about 150° F. to form the coating comprising the continuous phase, admixing the reactive powder such that it is embedded in or adhered to the continuous phase, then admixing the surface treatment.

27. A method of treating a subterranean formation comprising injecting into the subterranean formation a fracturing fluid comprising the free flowing coated particles of claim 18.

28. A method of forming a gravel pack comprising suspending the free flowing coated particles of claim 18 in a carrier fluid to form a suspension, pumping the suspension into a well bore, and draining the carrier fluid to form the gravel pack.

* * * * *